(12) United States Patent
Hull et al.

(10) Patent No.: US 7,375,835 B1
(45) Date of Patent: May 20, 2008

(54) E-MAIL TRANSMISSION OF PRINT-READY DOCUMENTS

(75) Inventors: Jonathan J Hull, San Carlos, CA (US); Derek E Poppink, Mountain View, CA (US)

(73) Assignee: Ricoh Co., Ltd., Minato-Ku, Tokyo (JP)

( * ) Notice: Subject to any disclaimer, the term of this patent is extended or adjusted under 35 U.S.C. 154(b) by 911 days.

(21) Appl. No.: 10/189,752

(22) Filed: Jul. 2, 2002

Related U.S. Application Data

(63) Continuation-in-part of application No. 10/046,447, filed on Oct. 29, 2001, now Pat. No. 7,305,381.

(51) Int. Cl.
*G06F 3/12* (2006.01)

(52) U.S. Cl. .................................... 358/1.15
(58) Field of Classification Search ............... 358/1.15
See application file for complete search history.

(56) References Cited

U.S. PATENT DOCUMENTS

| | | | |
|---|---|---|---|
| 5,809,167 A * | 9/1998 | Al-Hussein | 382/190 |
| 5,826,269 A | 10/1998 | Hussey | |
| 5,844,969 A | 12/1998 | Goldman et al. | |
| 5,859,971 A | 1/1999 | Bittinger et al. | |
| 5,905,777 A | 5/1999 | Foladare et al. | |
| 5,911,776 A | 6/1999 | Guck | |
| 5,973,695 A | 10/1999 | Walsh et al. | |
| 5,978,837 A | 11/1999 | Foladare et al. | |
| 6,160,631 A * | 12/2000 | Okimoto et al. | 358/1.15 |
| 6,173,322 B1 | 1/2001 | Hu | |
| 6,236,768 B1 | 5/2001 | Rhodes et al. | |
| 6,256,666 B1 | 7/2001 | Singhal | |
| 6,327,590 B1 | 12/2001 | Chidlovskii et al. | |
| 6,397,228 B1 | 5/2002 | Lamburt et al. | |
| 6,449,637 B1 | 9/2002 | Toga | |
| 6,487,278 B1 * | 11/2002 | Skladman et al. | 379/88.13 |

(Continued)

OTHER PUBLICATIONS

Marsan, C. D., "Printing to get Net Facelift," [online]. NetworkWorldFusion, Jul. 10, 2007 [retrieved on Sep. 19, 2002]. 4 Pages. Retrieved from the Internet: <URL: http://www.nwfusion.com/cgi-bin/mailto/x.cgi>. (Copy enclosed.).

(Continued)

*Primary Examiner*—Twyler Lamb Haskins
*Assistant Examiner*—Benjamin Dulaney
(74) *Attorney, Agent, or Firm*—Fenwick & West LLP

(57) ABSTRACT

A method, system, and computer program product for transmitting print-ready electronic documents to a printer using e-mail as a transport mechanism. Responsive to a user request, a source PC transmits a document in print-ready format, so that there is no need for the printer to run or activate the software application that was used to generate the document. Furthermore, by rendering the document at the source PC, the invention ensures that the user's selected print settings and preferences are preserved. The user need not be concerned with whether the destination printer has the appropriate software or is configured appropriately for the user's document. In alternative embodiments, the user grants permission to print a local document. Subsequently, when a recipient wishes to print the document, the most current version is retrieved from the source PC, so that the printed document reflects any changes that may have been made after the permission was granted.

12 Claims, 13 Drawing Sheets

U.S. PATENT DOCUMENTS

| | | | |
|---|---|---|---|
| 6,505,237 | B2 | 1/2003 | Beyda et al. |
| 6,542,892 | B1* | 4/2003 | Cantwell .................... 707/10 |
| 6,636,250 | B1 | 10/2003 | Gasser |
| 6,670,968 | B1* | 12/2003 | Schilit et al. ............... 715/760 |
| 6,697,942 | B1 | 2/2004 | L'Heureux et al. |
| 6,714,968 | B1 | 3/2004 | Prust |
| 6,741,855 | B1 | 5/2004 | Martin et al. |
| 6,801,935 | B2 | 10/2004 | Shen |
| 6,859,832 | B1* | 2/2005 | Gecht et al. ................ 709/224 |
| 6,876,462 | B2* | 4/2005 | Okada et al. .............. 358/1.15 |
| 6,952,724 | B2 | 10/2005 | Prust |
| 6,989,910 | B2* | 1/2006 | Lomas et al. .............. 358/1.15 |
| 6,993,527 | B1 | 1/2006 | Raman et al. |
| 7,000,001 | B2* | 2/2006 | Lazaridis .................... 709/217 |
| 7,047,242 | B1 | 5/2006 | Ponte |
| 7,075,669 | B2* | 7/2006 | Reddy ....................... 358/1.14 |
| 7,080,099 | B2 | 7/2006 | Tada et al. |
| 7,110,998 | B1 | 9/2006 | Bhandari et al. |
| 7,136,180 | B2* | 11/2006 | Utsunomiya ............... 358/1.15 |
| 7,203,725 | B1 | 4/2007 | Gilmour et al. |
| 2001/0013029 | A1 | 8/2001 | Gilmour |
| 2001/0034774 | A1* | 10/2001 | Watanabe et al. ........... 709/217 |
| 2001/0042032 | A1* | 11/2001 | Crawshaw et al. ........... 705/32 |
| 2002/0019851 | A1* | 2/2002 | Pollack ....................... 709/206 |
| 2002/0042838 | A1* | 4/2002 | Tabayoyon et al. ......... 709/237 |
| 2002/0073076 | A1 | 6/2002 | Xu et al. |
| 2002/0131070 | A1* | 9/2002 | Housel et al. .............. 358/1.15 |
| 2002/0140989 | A1* | 10/2002 | Shinchi et al. .............. 358/402 |
| 2002/0191210 | A1* | 12/2002 | Staas et al. ................. 358/1.15 |
| 2002/0194307 | A1* | 12/2002 | Anderson et al. ........... 709/219 |
| 2003/0028587 | A1 | 2/2003 | Driscoll et al. |
| 2003/0030834 | A1* | 2/2003 | Parry ......................... 358/1.14 |
| 2003/0035136 | A1* | 2/2003 | Yamagishi et al. ........ 358/1.15 |
| 2003/0063309 | A1* | 4/2003 | Parry ......................... 358/1.15 |
| 2003/0069877 | A1 | 4/2003 | Grefenstette et al. |
| 2003/0086124 | A1* | 5/2003 | Parry ......................... 358/402 |
| 2003/0187951 | A1 | 10/2003 | Shen |
| 2003/0236871 | A1* | 12/2003 | Thurlow ..................... 709/223 |
| 2004/0019643 | A1 | 1/2004 | Zirnstein, Jr. |
| 2004/0088318 | A1 | 5/2004 | Brady |
| 2004/0177159 | A1 | 9/2004 | Butterfield et al. |

OTHER PUBLICATIONS

PrintMe Networks web pages [online]. PrintMe Networks [retrieved on Sep. 19, 2002]. 18 Pages. Retrieved from the Internet: <URL: https://www.printme.com/>. (Copy enclosed.).

"Autonomy Technology White Paper," Autonomy Systems Ltd., 19 pages, Feb. 2001.

"Discover More: A Technical White Paper on the Stratify Discovery System," Stratify, Inc., v1.1, pp. 1-18, Aug. 2001.

Clarke, I., "A Distributed Decentralised Information Storage and Retrieval System," Division of Informatics, University of Edinburgh, pp. 1-43, 1999.

Poppink, D., "Query Preview, Unplugged!," Ricoh Innovations, Inc., 8 pages.

Rhodes, B.J., and Maes, P., "Just-in-Time Information Retrieval Agents," IBM Systems Journal, vol. 39, Nos. 3&4, p. 685-704, 2000.

Rhodes, B. J., "Just-In-Time Information Retrieval," Program in Media Arts and Sciences, Massachusetts Institute of Technology, pp. 1-133, May 2000.

Projects, Watson [online]. InfoLab [retrieved on Jan. 10, 2002]. Retrieved from the Internet: <URL: http://dent.infolab.nwu.edu/infolab/projects/project.asp?ID=5>. (2 pages).

Microsoft Office—White Paper: Overview of Smart Tag Technology in Office XP [online]. Microsoft, Inc. [retrieved on Oct. 2, 2001]. Retrieved from the Internet: <URL: http://www.microsoft.com/office/developer/platform/smartag.htm>. (4 pages).

Microsoft Office & Visual Basic for Applications Developer, Interacting with Smart Tags, The SmartTags Collection and SmartTag Object [online]. Microsoft, Inc. [retrieved on Oct. 2, 2001]. Retrieved from the Internet: <URL: http://msdn.microsoft.com/library/en-us/dnovba01/html/interactingwithsmarttags.asp?frame>. (10 pages).

Almaden Computer Science Research, BlueEyes Suitor [online]. IBM [retrieved on Jan. 10, 2002]. Retrieved from the Internet: <URL: http://www.almaden.ibm.com/cs/blueeyes/suitor.html>. (1 page).

RichLink Technology: How RichLink Works [online]. Sentius Corporation 1993-2001 [retrieved on Jan. 10, 2002]. Retrieved from the Internet: <URL: http://www.sentius.com/RL/english/solutions/c_30301.html>, (2 pages).

Wood, D., "Programming Internet Email," Sebastopol, CA, O'Reily and Associates, 1999, pp. 38-40 and 46-57.

* cited by examiner

E-MAIL TRANSMISSION OF PRINT-READY DOCUMENTS

CROSS-REFERENCE TO RELATED APPLICATIONS

The present application is a continuation-in-part of U.S. patent application Ser. No. 10/046,447 for "Asynchronous Unconscious Retrieval in a Network of Information Appliances," filed Oct. 29, 2001, now issued as U.S. Pat. No. 7,305,381, the disclosure of which is incorporated herein by reference.

The present application is related to U.S. patent application Ser. No. 10/163,542 for "Remote Retrieval of Documents," filed Jun. 5, 2002, now issued as U.S. Pat. No. 7,328,425, the disclosure of which is incorporated herein by reference.

The present application is further related to U.S. patent application Ser. No. 10/188,912 for "Remotely Initiated Document Transmission," filed on the same date as the present application, the disclosure of which is incorporated herein by reference.

BACKGROUND OF THE INVENTION

1. Field of the Invention

The present invention is related to printing documents, and more particularly to transmitting print-ready electronic documents to a printer using e-mail as a transport mechanism.

2. Description of the Background Art

Document transmission via e-mail is well known in the art, and has become increasingly common as Internet connectivity has become ubiquitous. The most prevalent use of such e-mail transmission is from one computer to another. However, many other types of devices, such as printers, document storage devices, and the like are now configured for Internet protocols and connectivity, so that e-mail transmission among these various types of devices has emerged as an efficient transport mechanism.

For example, a printer may be assigned an e-mail address, and may be configured to print documents that are received at its e-mail address. Such an arrangement provides an easy way to implement network connectivity and accessibility for a printer (or other resource). Users can send documents to the printer from any location that is capable of sending e-mail (subject to security considerations such as firewalls and the like). Typically, this operation is initiated by attaching a document to an e-mail message, specifying the e-mail address of the printer, and sending the e-mail. The document may be in a conventional format, such as a Microsoft Word .doc format (for a word processing document) or a Microsoft Excel .xls format (for a spreadsheet document), or the like.

In order for the printer to be able to properly process incoming documents, it may run an automated script that provides instructions for receiving and processing incoming e-mails. In addition, the printer generally must run some version of the software that was used to create the documents to be printed, or alternatively a specialized software version that is capable of reading and rendering the received documents. For example, if a printer receives a Microsoft Word document for printing, the printer generally cannot print out the document unless it runs some version of Microsoft Word (or another software program that is capable of reading Microsoft Word files and rendering them for printing).

It is often disadvantageous, or even unfeasible, for destination printers to run software applications such as Microsoft Word in order to implement printing via e-mail. One disadvantage is that such software applications typically include many configuration options that are specific to a particular installation. If the software at the printer is not configured the same way as the software at the user's computer, the output may not be what the user expects. In fact, in such a situation the user may not have adequate control over key elements of the printing operation, such as for example the size of paper, orientation of the printout (portrait or landscape), number of copies, whether or not to include hidden text, and the like. Such elements are usually selected by a user via a Print Setup dialog box; however, when a document is e-mailed to a printer for automated printing upon receipt, the user may lose control over such elements.

In addition, full versions of such software applications, which are often quite large and processor-intensive, may make undue demands on the processor time of printers. Running such applications at the printer is an inefficient use of system resources, as the printer is unable to make use of most of the functionality of the software application, but is forced to run the application merely to facilitate printing. Scaled-down versions of such software applications may be a viable option, but such versions are not always available.

Even when scaled-down versions are available, or when the printer is able to run the full versions without detrimental effect, additional disadvantages remain. Since a printer cannot print a document unless some version of the software that created the document is running at the printer, the choice of which printer to use for a particular print job may be limited. Users are required to know which printers are running which applications (and possible even which versions of applications) before they can be confident that a printer is capable of printing a particular document. User may become frustrated at such limitations on flexibility and choice of printing destinations.

Another disadvantage of conventional schemes for sending a document to a printer via e-mail is that the user is required to specify the e-mail address of the printer. If a user wishes to make a printed copy of a document available for a second user, at a printer that is located near the second user, there is generally no mechanism for sending the print job to the appropriate printer, unless the e-mail address of the particular printer is known. The user may instead simply send the document to the second user, and allow the second user to print the document as needed; however, such an approach carries several disadvantages. For example: the document may not print in the same format as was originally intended; the second user may inappropriately modify the document before printing it; the second user may feel burdened by the need to manually open and print the received document.

In addition, if a user sends a document to a second user, and subsequently revises or updates the document, the second user may not be aware that the version of the document he or she received is now out of date. Subsequently, the second user may print the received document and mistakenly assume that the printed version is the most up-to-date version available.

What is needed is a technique for printing a document received at a printer via e-mail, without requiring that the printer run or activate a version of the software that created the document. What is further needed is a technique for sending a print job to a printer via e-mail, while retaining settings and preferences for the document to be printed.

What is further needed is a mechanism for transmitting a print-ready document to a printer via e-mail. What is further needed is a technique for a first user to transmit a print-ready document to a printer that is accessible by a second user, without having to specify the e-mail address of the printer. What is further needed is a technique for transmitting a document to a second user for printing, while ensuring that the printed version is the most recent, current version of the document, even if revisions have been made after the document was transmitted.

What is further needed is a technique for sending print jobs to a printer that avoids the limitations described above, minimizes overhead, and improves efficiency.

SUMMARY OF THE INVENTION

In the following description, the term "source PC" refers to a PC (or other device) on which a desired electronic document is stored. The document may be stored, for example, on a hard drive attached to the PC, or on another storage device (such as a network-connected drive) to which the PC has access. The term "destination" refers to a printer (or other device) to which the electronic document is to be sent, for example to be printed or otherwise output. The present invention may be practiced regardless of the actual physical locations of the user and the devices.

The present invention provides techniques for printing a document received at a printer via e-mail, without requiring that the printer run or activate a version of the software that created the document. According to the present invention, the source PC renders a document and transmits it to the printer in a print-ready format. Since the document arrives at the printer already rendered and ready for printing, there is no need for the printer to run or activate the software application that was used to generate the document. Furthermore, by rendering the document at the source PC, the present invention ensures that the user's selected print settings and preferences are preserved. The user need not be concerned with whether the destination printer has the appropriate software or is configured appropriately for the user's document.

In one embodiment, the source PC encrypts the document before sending it to the printer. A password may be provided to the printer for authentication purposes. The password may be provided in advance, or it may accompany the document, or an attendant at the printer may key it in manually.

In another embodiment, the present invention facilitates transmission of a print-ready document from a source PC to a destination printer, without requiring that the user specify the e-mail address of the destination printer. Rather, the user may specify that the document be transmitted to a second user with the intention that the second user will receive a printout of the document. The print job is automatically routed to a printer that is conveniently located with respect to the second user, and appropriate for the print job. The invention thus implements a document communication mechanism that is analogous to facsimile transmission, in that it results in a hard copy printout of the document being delivered to the second user via a printing device located near or convenient to the second user.

In such an embodiment, the first user specifies a destination by providing the e-mail address of the second user or of the second user's computer. The source PC sends a Print Request e-mail message to the specified e-mail address. The recipient PC automatically responds by routing the print request to a conveniently located and configured printer. The recipient PC may provide the printer's e-mail address to the source PC, so that the source PC can subsequently transmit the print job directly to the printer via e-mail. If appropriate, the recipient PC may provide one or more alternative printer e-mail addresses to the source PC, to be used in case the primary printer is down, out of paper, or otherwise unavailable. Alternatively, the recipient PC receives the print job and routes it, via e-mail, to the appropriate printer. In either alternative, prior to initiating transmission of the documents, source PC receives (from the recipient PC or from the printer, or from some other node on the system) "permission information" containing particulars describing the available printer, including their technical capabilities, print formats, paper trays available, and the like. Thus, source PC is able to offer the first user a series of options equivalent to what would be available when printing locally.

In another embodiment, the present invention provides a mechanism for ensuring that when a second user receives a document for printing, and then subsequently prints the received document, the printed version is the most up-to-date version of the document available. Thus, even if the first user revises or updates the document after transmitting it to the second user, the version available for printing by the second user is the most current and correct version. The present invention provides such a mechanism by transmitting a pointer or link to the document on the first user's computer, in lieu of transmitting the actual document itself. Along with the link, the e-mail from first user also includes a key code or other permission information to allow the second user's computer to access the document for printing. Thus, when the second user wishes to print the document, the document is automatically accessed via the link, retrieved, and printed, thus ensuring that the version being printed is the most current version of the document.

The present invention thus provides a technique for transmitting documents to a printer via e-mail, while avoiding the disadvantages and limitations of the prior art. By transmitting print-ready versions of documents, the invention ensures that hard copy printouts are accurate and are in accord with preferences and configuration parameters of the source PC. Furthermore, the present invention provides e-mail transmission to printers in a secure manner that does not require that a copy of the application used to create the document be installed at the printer. Finally, the present invention provides a mechanism for transmitting a document to a printer conveniently located near a designated recipient, without specifying the e-mail address of the printer.

Figure 1:
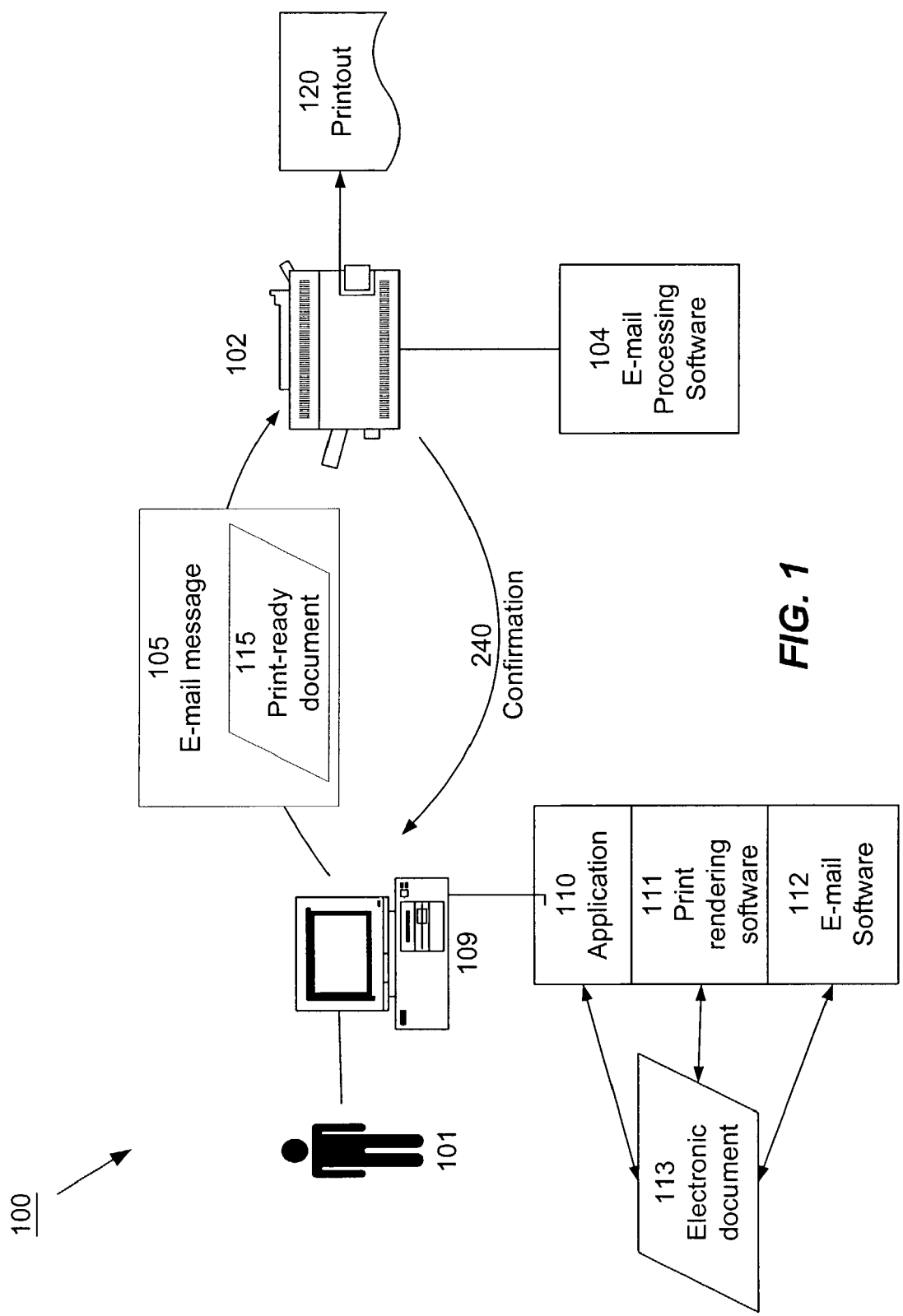
FIG. 1 is a block diagram depicting a system for transmitting a print-ready electronic document to a printer using e-mail as a transport mechanism.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantifies within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Moreover, the present invention claimed below is operating on or working in conjunction with an information system. Such an information system as claimed may be the entire workflow system as detailed below in the preferred embodiment or only portions of such a system. For example, the present invention can operate with an information system that need only be a browser in the simplest sense to present and display objects. Thus, the present invention is capable of operating with any information system from those with minimal functionality to those providing all the functionality disclosed herein.

System

Figure 6:
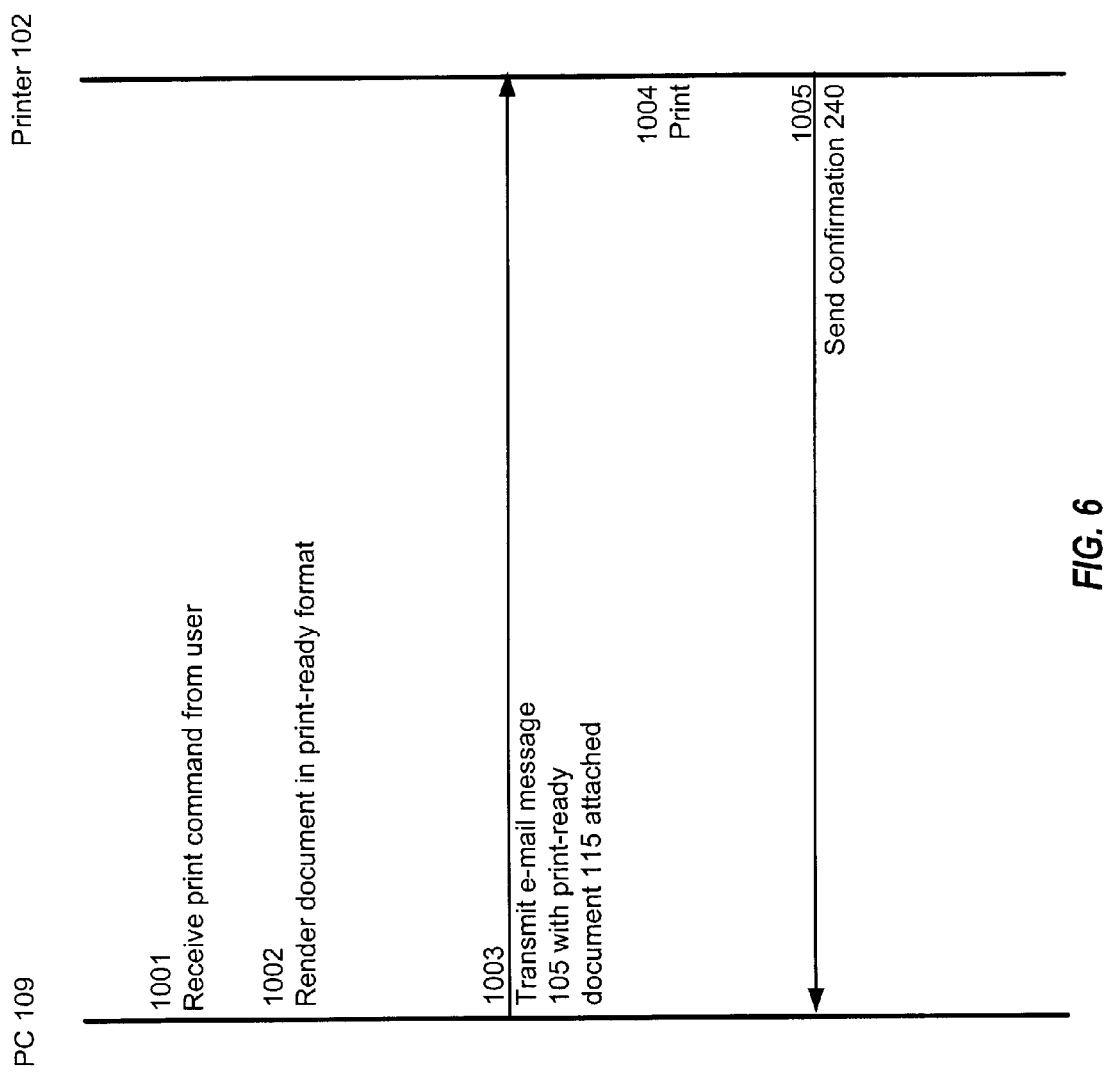
FIG. 6 is an event trace diagram depicting a series of steps for transmitting a print-ready electronic document to a printer using e-mail as a transport mechanism.

Referring now to FIG. 1, there is shown a block diagram depicting a system 100 for transmitting a print-ready document to a printer using e-mail as a transport mechanism, according to one embodiment of the present invention. Referring also to FIG. 6, there is shown an event trace diagram depicting a series of steps for transmitting a print-ready document to a printer using e-mail as a transport mechanism, according to one embodiment of the present invention. User 101 interacts with PC 109, which for illustrative purposes is described herein as a conventional personal computer; however, any device, such as a printer, fax machine, multifunction device, personal digital assistant (PDA), or the like, can be substituted for PC 109. Printer 102 is a conventional network-connected printer to which user 101 wishes to transmit a document in order to generate hard-copy output. One skilled in the art will recognize that other types of output devices, including document storage appliances, displays, and the like, can be used.

PC 109 may be implemented as a conventional personal computer, comprising a central processing unit, input and output device, memory, and storage device such as a hard drive (not shown). In one embodiment, PC 109 runs an operating system such as Microsoft Windows XP® or Unix, including a graphical user interface for providing control functions and file management functions. PC 109 may also have other functionality and may run additional applications, such as for example word processing, e-mail, spreadsheet, and web browser applications.

The storage device of PC 102 contains electronic document 113, among other documents, files, applications and the like that are commonly stored on such media. Document 113 may be any document that has been created by application 110 on PC 109, or that has been received or obtained from some other source, such as by downloading or receipt via e-mail. In general, as is known in the art, user 101 activates an application 110 in order to open, view, or edit electronic document 113. For example, if document 113 was created in Microsoft Word, user activates Microsoft Word 101 in order to open, view, or edit electronic document 113. It is further known in the art that the operating system of PC 109 can recognize file types, so that when user 101 enters a command to open document 113 (such as by double-clicking on an icon representing document 113), PC 109 checks the file type of document 113, automatically activates an application 110 associated with the file type, and then opens document 113 from within the application 110. In general, if application 110 for the file type of document 113 is not available, PC 109 cannot open application 110.

It is understood that PC 109 and printer 102 are connected to a network (not shown), such as the Internet, or a local area network (LAN) or wide area network (WAN), or the like, using known protocols and techniques for network communication and infrastructure. Accordingly, PC 109 and printer 102 each include hardware and software for establishing and maintaining network connections using standard network protocols such as TCP/IP, HTTP, and SMTP as are known in the art. The present invention may be implemented on virtually any type of computer network, although for purposes of clarity the following description assumes that the network is capable of supporting and transmitting e-mail messages from one node to another.

In one embodiment, the functionality of the present invention is implemented as a plurality of software components. Print rendering software 111, running at PC 109, is capable of generating a print-ready document 115 according to techniques that are known in the art. For example, given a Microsoft Word document, software 111 may generate a PostScript file containing a representation of the printable image for each page of the document. E-mail software 112, running at PC 109, generates and initiates transmission of e-mail messages such as message 105. In one embodiment, software 112 automatically generates message 105, attaches print-ready document 115, and initiates transmission of message 105, as will be described in more detail below. Such operation of print rendering software 111 and e-mail software 112 may take place upon receipt of a command or request from user 101 to transmit a file to printer 102. In one embodiment, PC 109 encrypts document 115 before transmitting it.

E-mail processing software 104, running at printer 102, automatically processes received e-mail containing print-ready documents 115. In one embodiment, software 104 performs such automated processing by retrieving the attachment and printing out the document 115. These operations can be implemented, for example, using a script that responds to incoming e-mail messages, according to known techniques. In one embodiment, software 104 decrypts document 115 before printing it. In one embodiment, a user or attendant must enter a password and/or provide biometric validation information at printer 102 before document 115 is decrypted or printed. This password may be the user's private key (according to a public/private key encryption system as is well known in the art). Alternatively, the password can be chosen from a one-time pad or list of unique passwords. The initial prompt would indicate which password from a given list the user should enter. In one embodiment, this password is known when the document is initially encrypted. An advantage of the one-time pad approach is that the knowledge of one password provides no information about other passwords that might be used.

In one embodiment, the e-mail processing software is configured with a time-out parameter so that print-ready documents are automatically deleted after they have resided on the printer beyond the time-out period. The time-out can be expressed as a fixed length of time or a specific clock time (e.g., 1:25 AM PST). The deletion could occur whether or not the documents have been printed. That is, they might be retained after printing in anticipation of the user requesting another hard copy.

Software components 111, 112, and 104 may be preinstalled as part of an operating system installation, or may be installed at any time.

User 101 initiates a print command on PC 109, specifying a destination printer 102. In one embodiment, the print command contains, for example, an indication of which document 113 is to be printed and an e-mail address for destination printer 102. User 101 may also specify other parameters and preferences, such as the number of copies, paper type, enlargement or reduction, and the like. In one embodiment, all such parameters are specified via a Print dialog box according to techniques that are well known in the art. User 101 can specify which file to print may by any known technique, including for example:

right-clicking on an icon representing the document to activate a context-sensitive menu and selecting a Print command from the context-sensitive menu;
  selecting a Print command from within application 110 when document 113 is open;
  selecting a Print command from an operating system menu and selecting document 113 from a dialog box;
  typing in a file name, including path information if appropriate; or
  selecting from a menu containing recently- or commonly-accessed documents.

User 101 can specify a destination printer 102 by typing in an e-mail address associated with printer 102, or by selecting from a menu or list of available printers 102.

Figure 11:
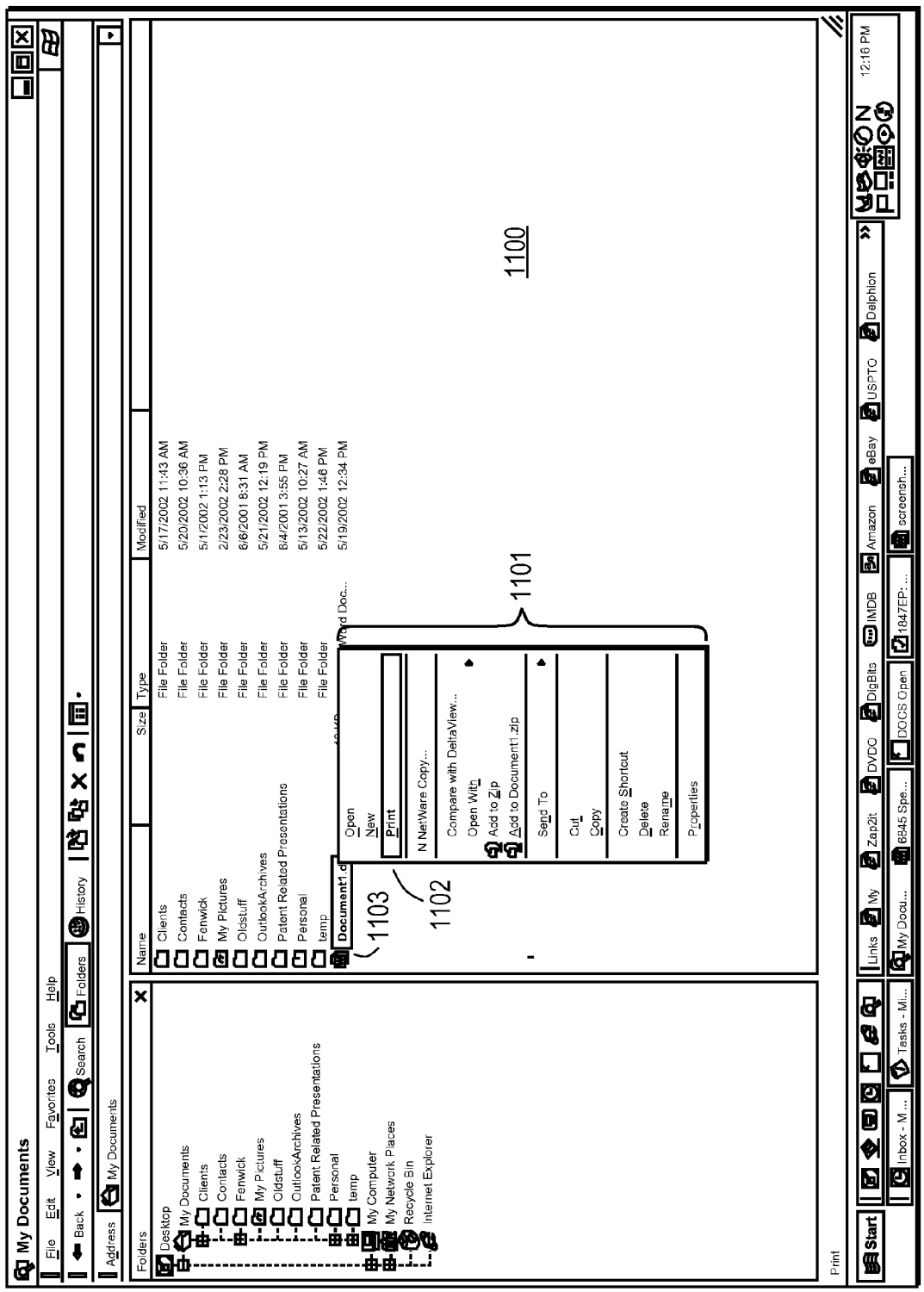
FIG. 11 is an example of a user interface screen for activating a Print command using a context-sensitive menu.

Referring now to FIG. 11, there is shown an example of a user interface screen 1100 for selecting a Print command 1102 from a context-sensitive menu 1101. User 101 can activate menu 1101 by right-clicking a mouse button while an on-screen cursor is positioned over an icon representing the document to be printed. In the example of FIG. 11, document 1103 is highlighted, indicating that the command selected from menu 1101 will be applied to document 1103. Thus, if user 101 selects Print command 1102, document 1103 will be sent to the printer, according to the techniques described herein.

Figure 12:
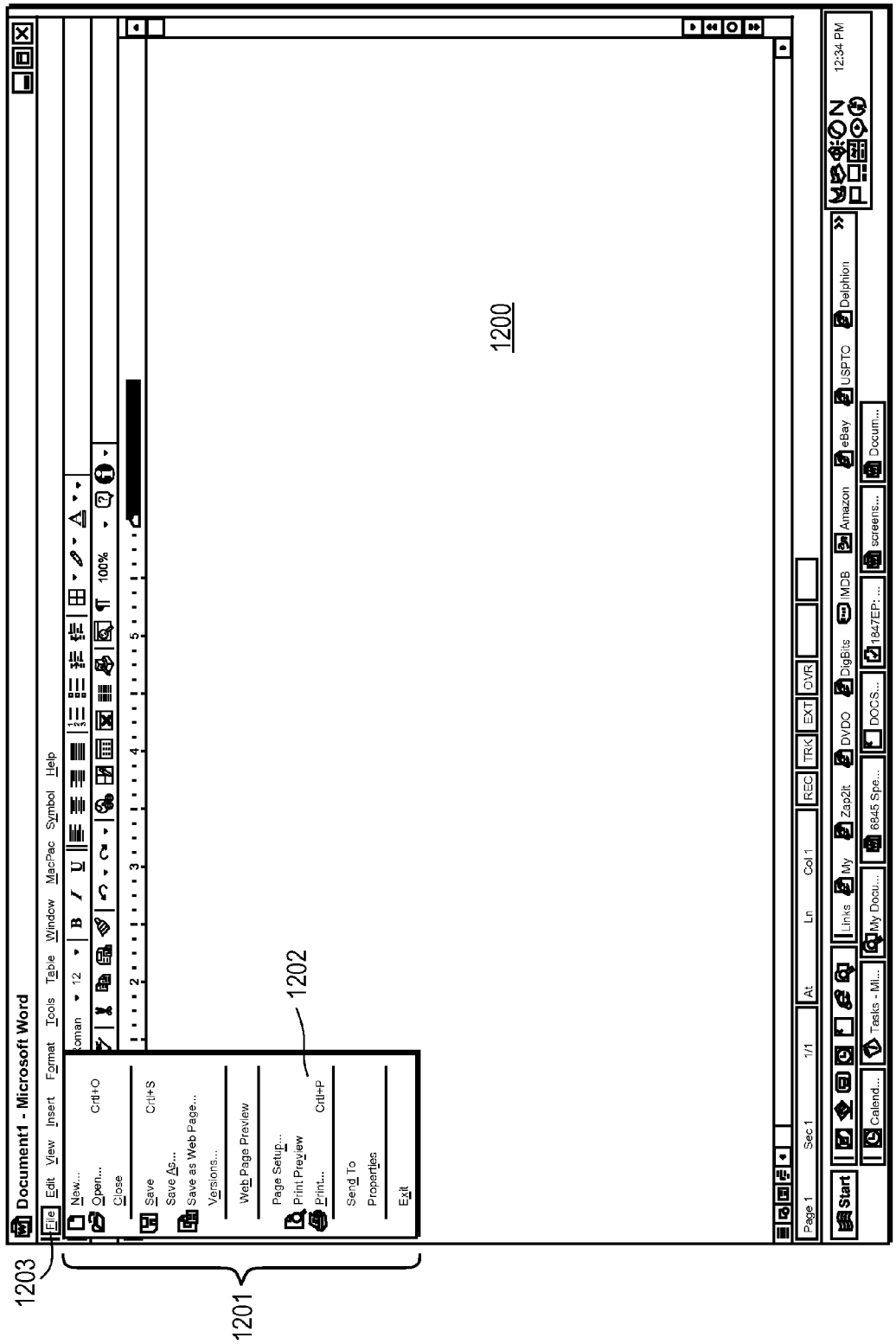
FIG. 12 is an example of a user interface screen for activating a Print command from within an application.

Referring now to FIG. 12, there is shown an example of a user interface screen 1200 for selecting a Print command 1202 from a menu 1201 within an application 110. User 101 can activate menu 1201 by clicking a mouse button on menu header 1203. In the example of FIG. 12, a document entitled "Document1" has been opened in Microsoft Word. Thus, if user 101 selects Print command 1202, Document1 will be sent to the printer, according to the techniques described herein.

Figure 13:
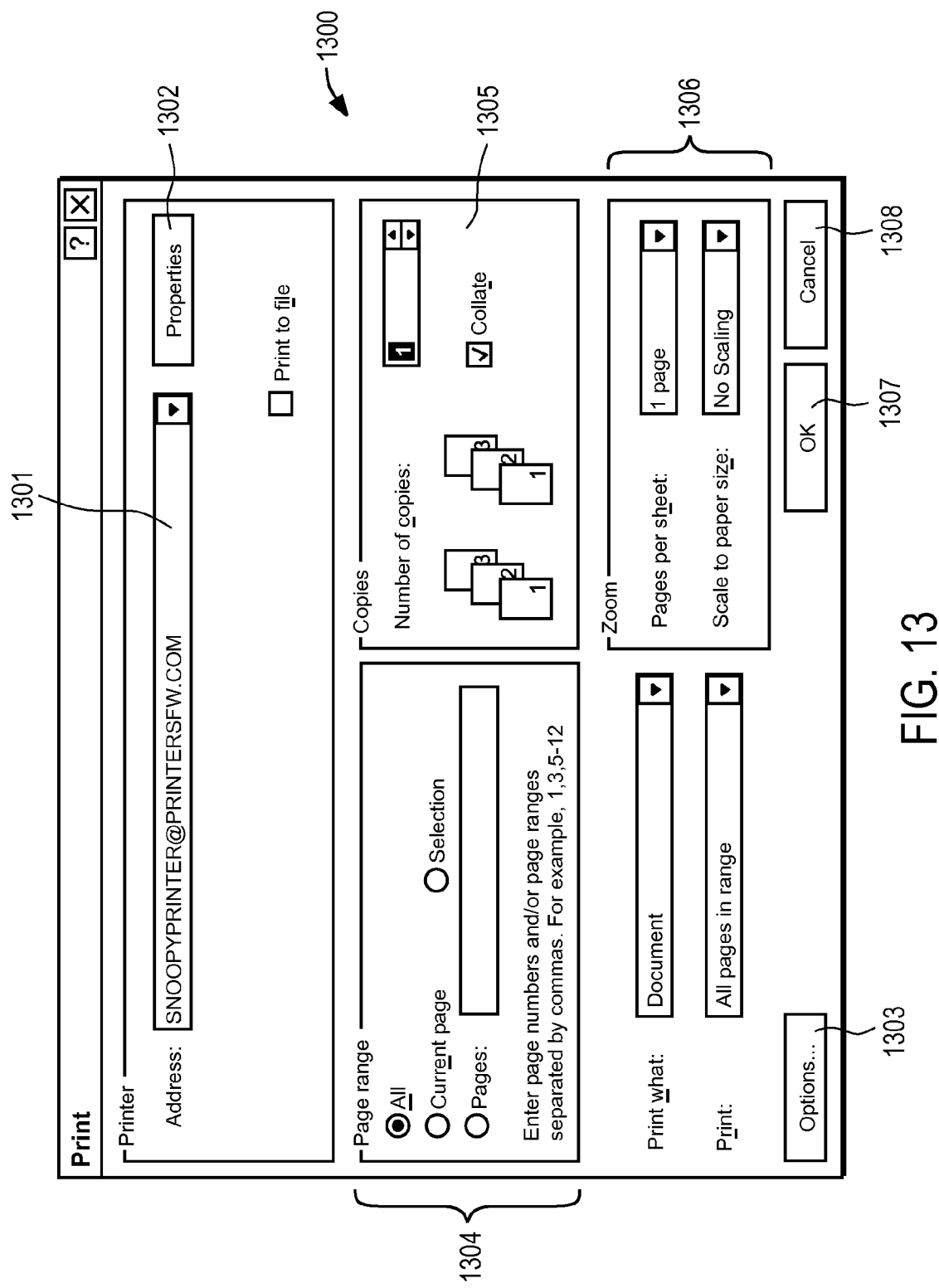
FIG. 13 is an example of a user interface screen for specifying a destination and other parameters for a Print command.

Referring now to FIG. 13, there is shown an example of a user interface screen 1300 for specifying print parameters and destination for a print operation according to one embodiment. Dialog box 1300 is presented to user 101, for example, in response to user activation of a Print command according to the techniques described above in connection with FIGS. 11 and 12, or by some other method. One skilled in the art will recognize that screen 1300 is merely exemplary, and that any other arrangement or layout for specifying print parameters and destination can be used.

In screen 1300, user 101 specifies a destination printer 102 by typing an e-mail address for the printer in address field 1301. In one embodiment, field 1301 also acts as a pull-down menu, allowing user 101 to select from a list of e-mail addresses for printers. This list can be preconfigured to include a set of known printers, or it can be generated dynamically based on usage, so that it includes previously or recently used printers, for example. Properties button 1302 provides access to a screen for configuring various properties specific to the selected printer. Options button 1303 provides access to a screen for specifying addition options for the print job. Examples of properties and options include: orientation, paper source (tray), two-sided printing, hidden text, reverse print order, and the like.

Page range selector 1304 allows user 101 to specify which pages of the document are to be printed. Copies selector 1305 allows user 101 to specify how many copies are to be printed, and whether the copies should be collated. Zoom selector 1306 allows user 101 to specify scaling and number of pages per sheet. Additional parameters and properties may also be specified, including for example a particular format for print-ready document 115, such as PostScript, Portable Document Format (PDF), or the like.

Once user 101 has specified the various properties, parameters, and destination for the print job, he or she clicks on OK button 1307 to initiate the process of rendering and transmitting document 113, as described below. Alternatively, user 101 can click on Cancel button 1308 to dismiss screen 1300 and cancel the print process.

Referring again to FIGS. 1 and 6, once PC 109 receives 1001 the print command from user 101, it renders 1002 document 113 according to the specified parameters and options. If application 110 has not been launched, PC 109 may automatically launch it in order to proceed with the print rendering 1002 operation. Print rendering software 111 is activated to perform the rendering. In one embodiment, print rendering software 111 is specialized with respect to the type of printer 102; in another embodiment, print rendering software 111 is generic and capable of generating a standardized print-ready document 115 in a format that is understood by most printers. Software 111 may be implemented as part of application 110, or it may be a component of the operating system of PC 109, or it may be a plug-in or otherwise installed software component. In one embodiment, software 111 renders 1002 document 113 in a PostScript format that is easily readable by many printers.

Once document 113 has been rendered 1002, PC 109 generates an e-mail message 105 addressed to printer 102 and containing print-ready document 115 as an attachment. PC 109 transmits 1003 e-mail message 105 using standard e-mail transmission protocols such as SMTP. In one embodiment, PC 109 calls e-mail software 112, which may be a standard e-mail software application such as Microsoft Outlook, having a script to facilitate automated operation, to generate and transmit message 105 to printer 102.

In one embodiment, PC 109 transmits message 105 to printer 102 using a one-time pad or other secure method. As is known in the art, a one-time pad is a system in which a randomly generated private key is used only once to encrypt a message that is then decrypted by the receiver using a matching one-time pad and key. E-mail encryption and transport is accomplished, in one embodiment, using a product such as Encryption Plus E-mail Enterprise, an e-mail plug-in available from PC Guardian of San Rafael, Calif., and described at www.pcguardian.com. One skilled in the art will recognize that any other e-mail encryption software can be used.

Upon receipt of message 105, printer 102 prints 1004 document 105. In one embodiment, e-mail processing software 104 installed at printer 105 receives and processes incoming e-mail messages 105. In one embodiment, e-mail processing software 104 is implemented as a standard e-mail software application, with a script for handling and automatically extracting and printing attachments. Printer 102 may be preconfigured with e-mail processing software 104 that contains instructions for processing received documents 115, or alternatively the operating system of source PC 102 may include functionality for processing received documents 115. The output of printer 102 is a hard copy printout 120. Once printer 102 has generated printout 120, in one embodiment printer 102 transmits 1005 confirmation 240 to PC 109. PC 109 can then inform user 101 that the print job was successfully completed, either by displaying a dialog box, or providing an on-screen message or audio signal, or by some other means.

For added security, in one embodiment printer 102 does not print document 115 until it receives confirmation that an authorized recipient is standing at printer 102. User 101 may specify that printer 102 should only print document 115 upon authentication of the recipient. Printer 102 then prompts for entry of a password on a local keypad, or it requests biometric input such as a thumbprint; such input is authenticated before the received document 115 is decrypted and printed. One skilled in the art will recognize that such authentication may be performed using any known means, including for example password authentication, biometric authentication, or the like.

The present invention can be implemented using any PC 109 and printer 102 having some kind of functionality for receiving and sending e-mail (or some other transport mechanism). The particulars of PC's 109 and printer's 102 network connectivity are irrelevant to the invention; thus, these components may be connected via a T1 line, digital subscriber line (DSL), cable modem, dialup connection, or the like. In one embodiment, printer 102 is on and connected constantly. In an alternative embodiment, printer 102 may be configured to periodically turn itself on, and/or to check and service e-mail messages from PCs 109 as described herein. Alternatively, a mail server (not shown) can be configured to turn on printer 102 when it receives e-mail.

One skilled in the art will recognize that other transmission techniques besides e-mail messages can be used to transmit print-ready document 115 and confirmation 240.

E-mail messages are advantageous because they may be sent between PC 109 and printer 102 even if a firewall is present; however, in alternative embodiments other transmission techniques may be used.

Figure 2:
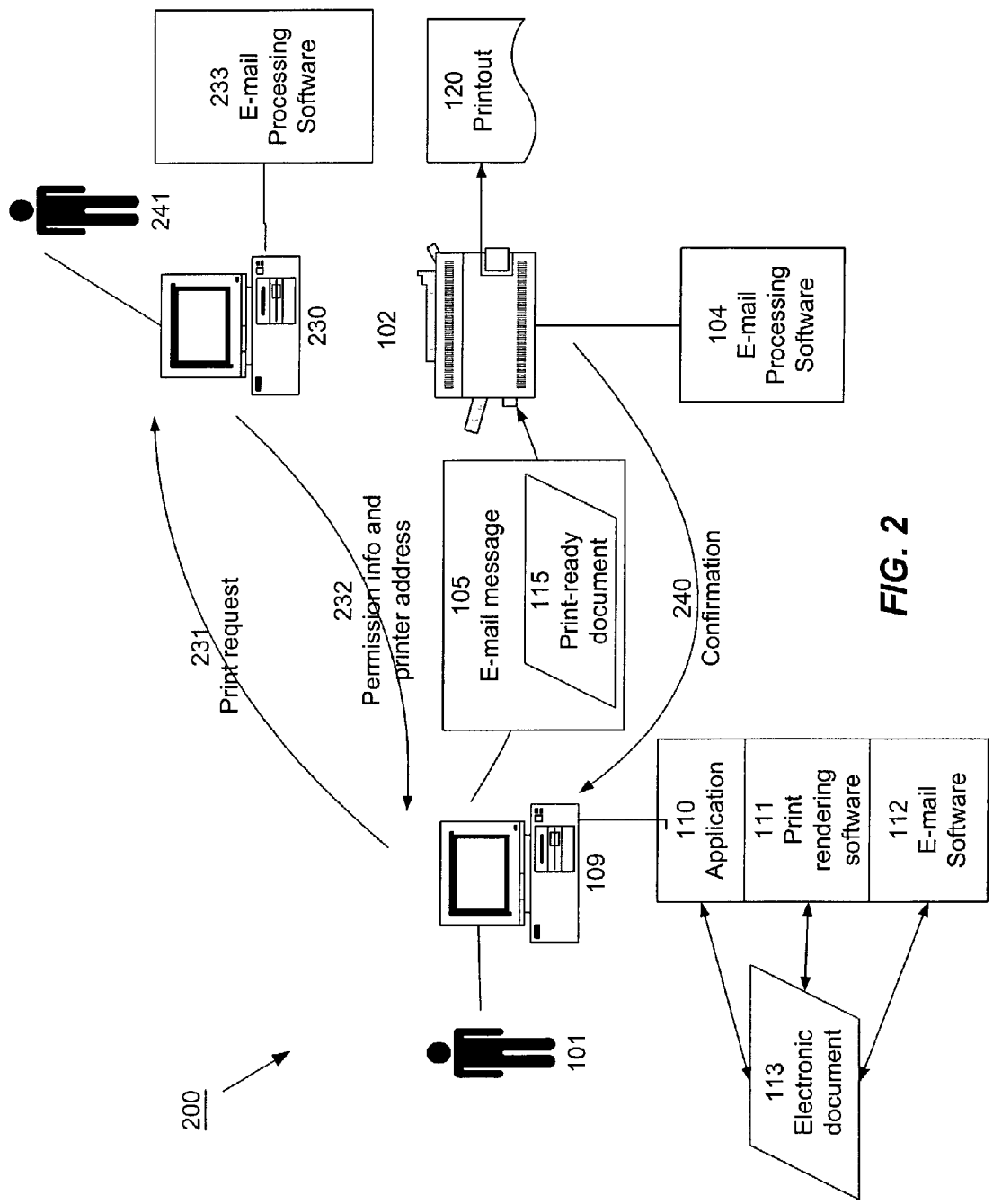
FIG. 2 is a block diagram depicting a system for transmitting a print-ready electronic document to a printer using e-mail as a transport mechanism, where the e-mail address of the printer is not known.
Figure 7:
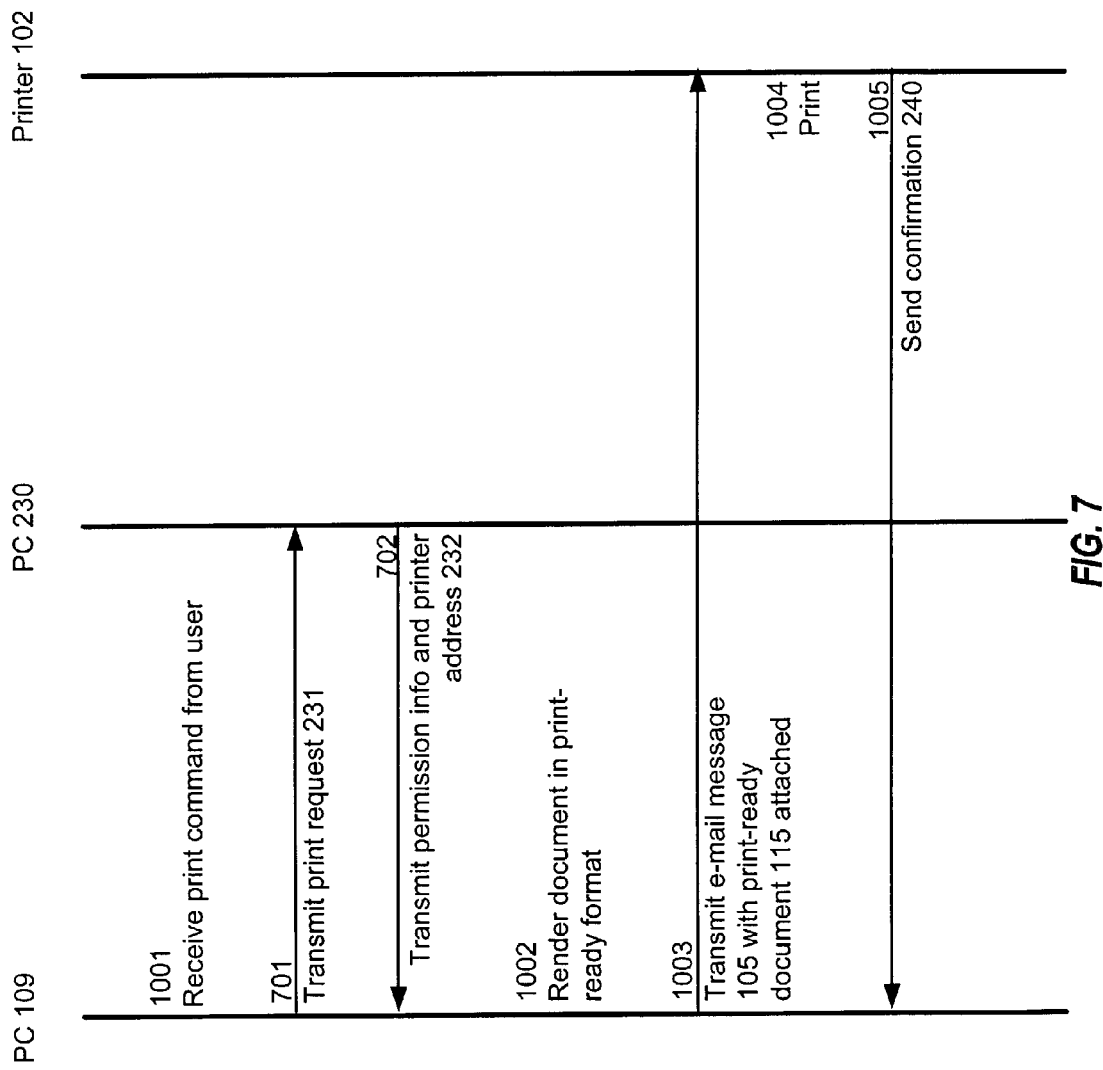
FIG. 7 is an event trace diagram depicting a series of steps for transmitting a print-ready electronic document to a printer using e-mail as a transport mechanism, where the e-mail address of the printer is not known.

Referring now to FIG. 2, there is shown a block diagram depicting a system 200 for transmitting a print-ready electronic document to a printer using e-mail as a transport mechanism, where the e-mail address of the printer is not known. Referring also to FIG. 7, there is shown an event trace diagram depicting a series of steps for transmitting a print-ready document to a printer using e-mail as a transport mechanism, where the e-mail address of the printer is not known, according to one embodiment of the present invention. System 200 is useful, for example, when user 101 wishes to send document 113 to a recipient at destination PC 230, while ensuring that the document received by the recipient has the same formatting and print preferences as if it were printed from user's 101 PC 109. System 200 provides functionality for transmitting document 113 in such a manner that the hard copy printout 120 preserves all such preferences, and further prevents the recipient for editing or altering the document. Furthermore, system 200 provides such functionality without requiring that application 110 or a version thereof be installed at destination PC 230 or printer 102. The following description assumes that the recipient is a user of PC 230 and has physical access to printer 102, and that user 101 and PC 109 are at a remote location with respect to destination PC 230 and printer 102. However, the present invention may be practiced regardless of the actual physical locations of user 101 and devices 109, 230, and 102.

Destination PC 230 is a personal computer; however, any device, such as a printer, fax machine, multifunction device, personal digital assistant (PDA), or the like, can be substituted for PC 230. E-mail processing software 233, running at PC 230, automatically processes print requests 231 received from PC 109. In one embodiment, software 233 performs such automated processing by transmitting a printer address and permission information 232 for accessing the printer, as well as the driver software (and the list of resident fonts, and the like) for the printer or a link to the driver software on a website or other accessible storage location. In one embodiment, initial print request 231 identifies the model (AMD 2400 GHz processor, rev. 2.567) of PC 109 and its operating system (e.g. Windows 3.1) so that the correct driver software or link is supplied. This configuration allows for the convenient update of driver information by the owner of the device and eliminates the need for user 101 to be concerned that he has the correct driver installed. The most current version of the driver is guaranteed to be available when the print-ready document is generated. These operations can be implemented, for example, using a script that responds to incoming e-mail messages, according to known techniques. Software component 233 may be preinstalled as part of an operating system installation, or may be installed at any time.

Other components shown in FIG. 2 are substantially similar to corresponding components as described above in connection with FIG. 1.

User 101 initiates a print command on PC 109, specifying a destination PC 203 or destination user 241. In one embodiment, the print command contains, for example, an indication of which document 113 is to be printed and an e-mail address for destination PC 203 or destination user 241. Particular techniques for activating the print command, specifying which file to print, and providing additional parameters and preferences, are described above in connection with FIGS. 1 and 6. User 101 can specify a destination PC 230 or destination user 241 by typing in an e-mail address associated with PC 230 or user 241, or by selecting from a menu or list of e-mail addresses for destinations (such as a list of previously-used destinations). In the embodiment of FIGS. 2 and 7, it is not necessary for user 101 to specify an e-mail address for printer 102.

Once PC 109 receives 1001 the print command from user 101, it transmits 701 an e-mail message to PC 230, containing a print request 231. Print request 231 may be provided in any predefined format, so that it will be recognized and understood by e-mail processing software 233 running at PC 230. Print request 231 may contain particulars of the print job being requested, such as the name and size of the document 113 to be printed, so that PC 230 can select an appropriate printer 102 for the print job. In an alternative embodiment, print request 231 may simply contain a request to print, without indicating any particulars of the print job.

PC 230 responds to print request 231 by transmitting 702 an e-mail message 232 to PC 109 containing a printer address and permission information for the printer 102 that is to receive the print job. The printer address may be provided as an e-mail address. The permission information includes, for example, an indication of which print driver is appropriate for the designated printer, as well as any other information that print rendering software 111 running at PC 109 may need in order to render the print job.

In one embodiment, message 232 contains addresses and permission information for more than one printer 102. This information may be provided, for example, as a ranked list. Thus, if PC 109 is unable to transmit the print job to the first printer 102 on the list, or if PC 109 does not receive confirmation that the print job successfully completed, PC 109 may attempt to transmit the print job to the next printer 102 on the list. Such attempts may be repeated, if necessary, on successive printers 102 on the list, until the print job is successfully completed or until all printers 102 on the list have been tried. In this manner, PC 109 is able to handle error conditions and other printer problems without having to send a new print request 231 to PC 230. In another embodiment, where message 232 contains information for one printer 102, PC 109 may send a new print request 231 if the first print job is unsuccessful.

Once PC 109 receives e-mail message 232, it renders 1002 document 113 according to the parameters and options specified by user 101, and in accordance with permission information received from PC 230. If application 110 has not been launched, PC 109 may automatically launch it in order to proceed with the print rendering 1002 operation. Print rendering software 111, appropriate to the destination printer as specified in permission information, is activated to perform the rendering.

Once document 113 has been rendered 1002, PC 109 generates an e-mail message 105 addressed to printer 102 and containing print-ready document 115 as an attachment. PC 109 transmits 1003 e-mail message 105 using standard e-mail transmission protocols such as SMTP. In one embodiment, PC 109 transmits message 105 to printer 102 using a one-time pad or other secure method. In one embodiment, if printer 102 is not capable of receiving documents via e-mail, PC 109 transmits e-mail message 105 to a print server (not shown), which then routes document 115 to printer 102.

Upon receipt of message 105, printer 102 prints 1004 document 105. Once printer 102 has generated printout 120, in one embodiment printer 102 transmits 1005 confirmation 240 to PC 109. Further description of steps 1002 through 1005 is provided above in connection with FIGS. 1 and 6.

One skilled in the art will recognize that other transmission techniques besides e-mail messages can be used to transmit print request 231, permission information and printer address 232, print-ready document 115, and confirmation 240. E-mail messages are advantageous because they may be sent among PC 109, PC 230, and printer 102 even if a firewall is present; however, in alternative embodiments other transmission techniques may be used.

The above-described system and method for transmitting document 115 directly to printer 102 conserves bandwidth, storage space, memory, and processing power at PC 230 by avoiding transmission of document 115 to PC 230. PC 230 is not required to process, receive, or open document 115 in its print-ready form or in its original form 113. This is particularly advantageous if PC 230 is a portable computer, handheld device, or PDA that has limited processing power, memory, and storage, or that may not have a high-speed connection to a network. In addition, PC 230 (or the corresponding device) is not required to have any particular print drivers or applications installed in order to facilitate printing of document 115. Thus, the invention provides improved efficiency and reduces the burden on PC 230 in receiving and printing documents.

In one embodiment, rather than providing a printer address to PC 109, PC 230 may provide an e-mail address for another PC (not shown) that is capable of printing document 115 or routing document 115 to a printer. In general, then, e-mail 232 may provide an e-mail address for any PC, print server, or other device that is capable of processing or routing the print job.

Figure 3:
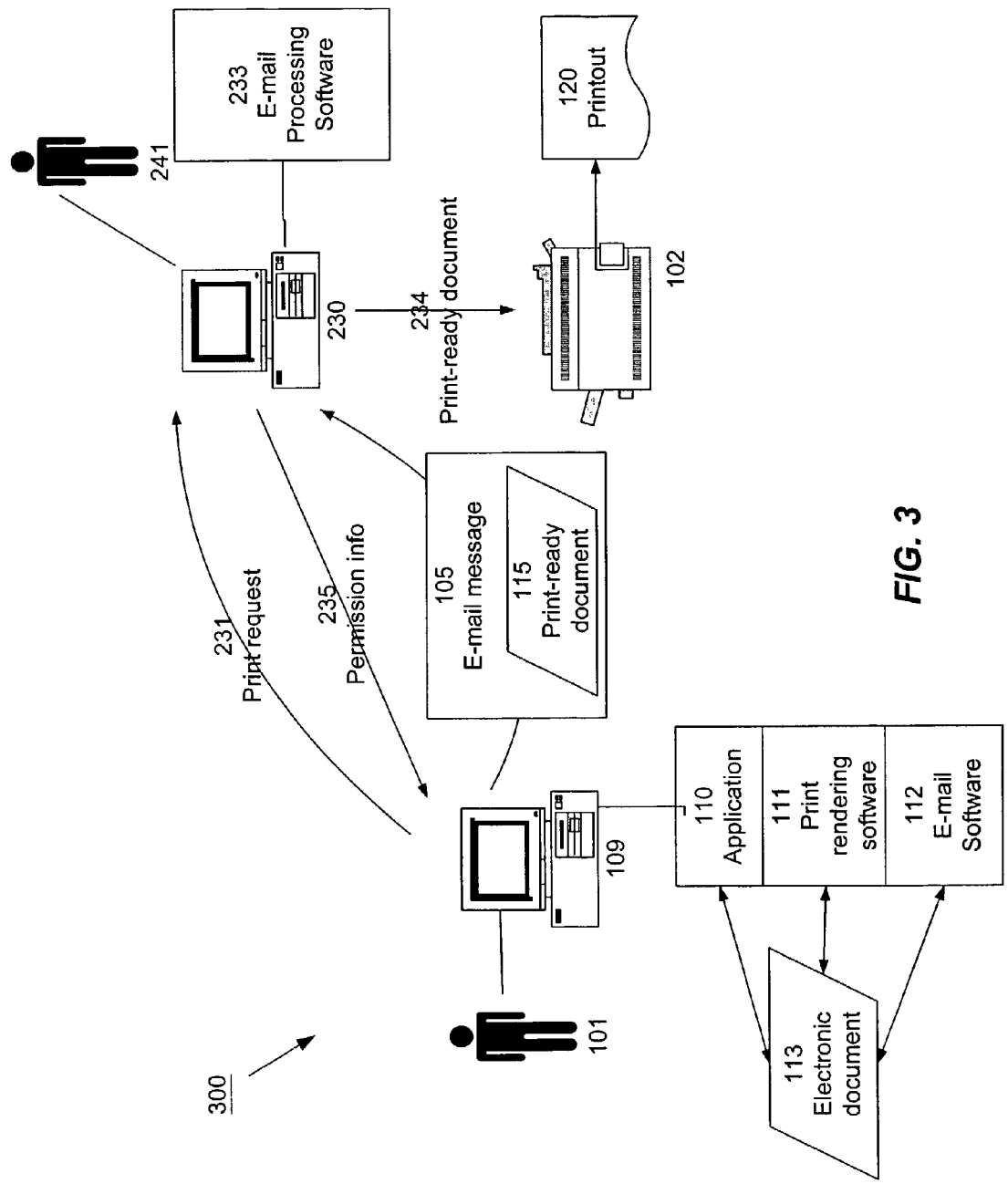
FIG. 3 is a block diagram depicting another embodiment of a system for transmitting a print-ready electronic document to a printer, using e-mail as a transport mechanism, where the e-mail address of the printer is not known.
Figure 8:
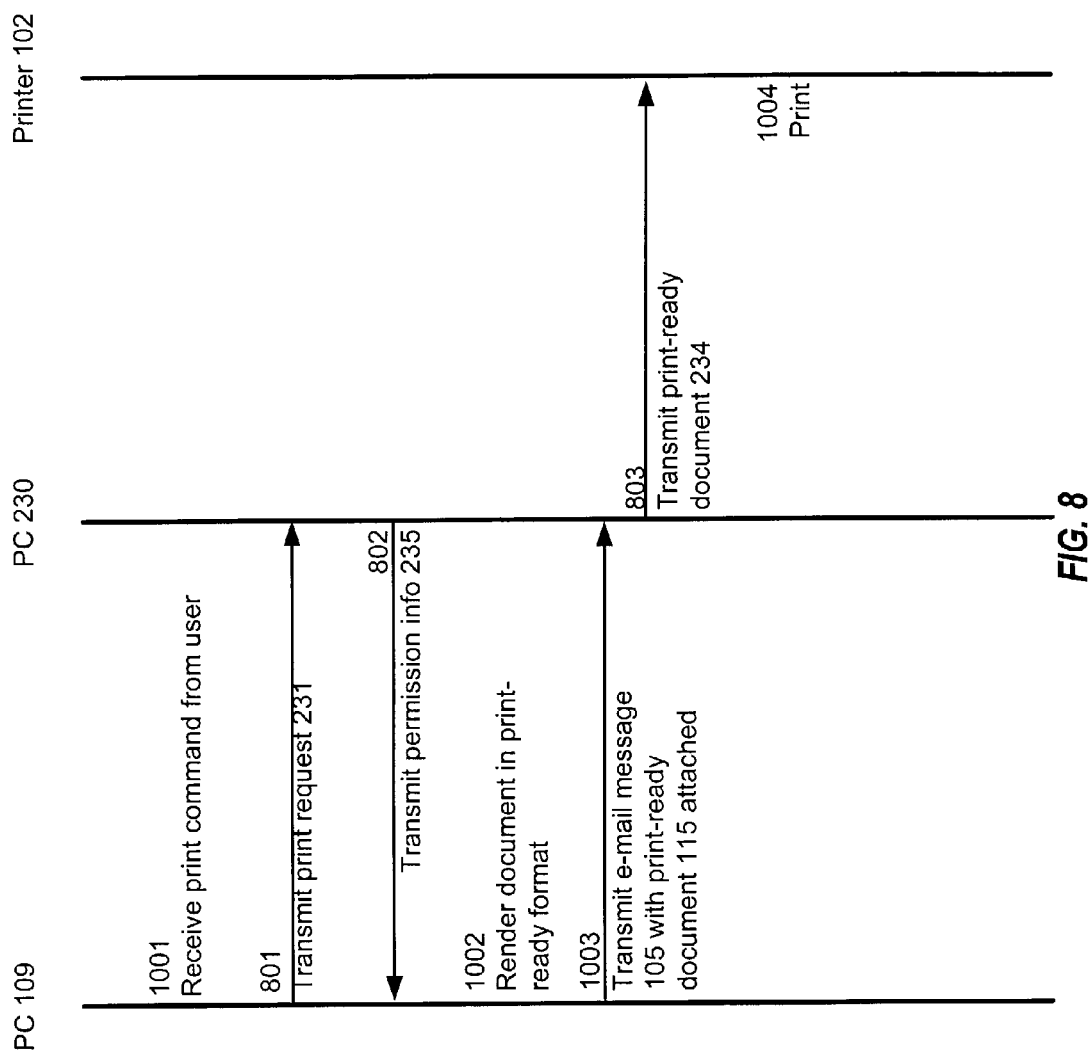
FIG. 8 is an event trace diagram depicting another embodiment of a series of steps for transmitting a print-ready electronic document to a printer using e-mail as a transport mechanism, where the e-mail address of the printer is not known.

Referring now to FIG. 3, there is shown a block diagram depicting another system 300 for transmitting a print-ready electronic document to a printer using e-mail as a transport mechanism, where the e-mail address of the printer is not known. Referring also to FIG. 8, there is shown an event trace diagram depicting a series of steps for transmitting a print-ready document to a printer using e-mail as a transport mechanism, where the e-mail address of the printer is not known, according to one embodiment of the present invention. The system and steps shown in FIGS. 3 and 8 are similar to those of FIGS. 2 and 7 described above, except that the print job is routed to printer 102 by PC 230 rather than being sent directly from PC 109 to printer 102. The components shown in FIG. 3 are substantially similar to corresponding components as described above in connection with FIGS. 1 and 2.

User 101 initiates a print command on PC 109, specifying a destination PC 203 or destination user 241. In one embodiment, the print command contains, for example, an indication of which document 113 is to be printed and an e-mail address for destination PC 203 or destination user 241. Particular techniques for activating the print command, specifying which file to print, and providing additional parameters and preferences, are described above in connection with FIGS. 1 and 6. User 101 can specify a destination PC 230 or destination user 241 by typing in an e-mail address associated with PC 230 or user 241, or by selecting from a menu or list of e-mail addresses for destinations (such as a list of previously-used destinations). In the embodiment of FIGS. 3 and 8, it is not necessary for user 101 to specify an e-mail address for printer 102; however, it may include information describing destination printer 102 so that the appropriate print drivers can be used for the print job.

Once PC 109 receives 1001 the print command from user 101, it transmits 801 an e-mail message to PC 230, containing a print request 231. PC 230 responds to print request 231 by transmitting 802 an e-mail message 235 to PC 109 containing permission information for the printer 102 that is to receive the print job. In this embodiment, e-mail message 235 need not include the e-mail address of printer 102, since the print job will be routed to printer 102 by PC 230. Thus, PC 109 does not need to know the e-mail address of printer 102, but rather can send the print job to PC 230.

Once PC 109 receives e-mail message 232, it renders 1002 document 113 according to the parameters and options specified by user 101, and in accordance with permission information received from PC 230. If application 110 has not been launched, PC 109 may automatically launch it in order to proceed with the print rendering 1002 operation. Print rendering software 111, appropriate to the destination printer as specified in permission information, is activated to perform the rendering.

Once document 113 has been rendered 1002, PC 109 generates an e-mail message 105 addressed to destination PC 230 and containing print-ready document 115 as an attachment. PC 109 transmits 1003 e-mail message 105 using standard e-mail transmission protocols such as SMTP. In one embodiment, PC 109 transmits message 105 to PC 230 using a one-time pad or other secure method. Upon receipt of message 105, PC 230 routes 803 the print job as a print-ready document 234 to printer 102, which prints 1004 document 105. PC 230 can send document 234 to printer 102 by any technique, including conventional techniques for sending print jobs to printers, or via e-mail. In some embodiments, printer 102 is not required to have an e-mail address or be accessible via e-mail, since print jobs are transmitted from PC 230 to printer 102 by means other than e-mail transmission. In one embodiment, once PC 230 receives acknowledgement that printer 102 has generated printout 120, in one embodiment PC 230 transmits 1005 confirmation of printing to PC 109.

One skilled in the art will recognize that other transmission techniques besides e-mail messages can be used to transmit print request 231, permission information 235, print-ready document 115, and confirmation. E-mail messages are advantageous because they may be sent between PC 109 and PC 230 even if a firewall is present; however, in alternative embodiments other transmission techniques may be used.

Figure 4:
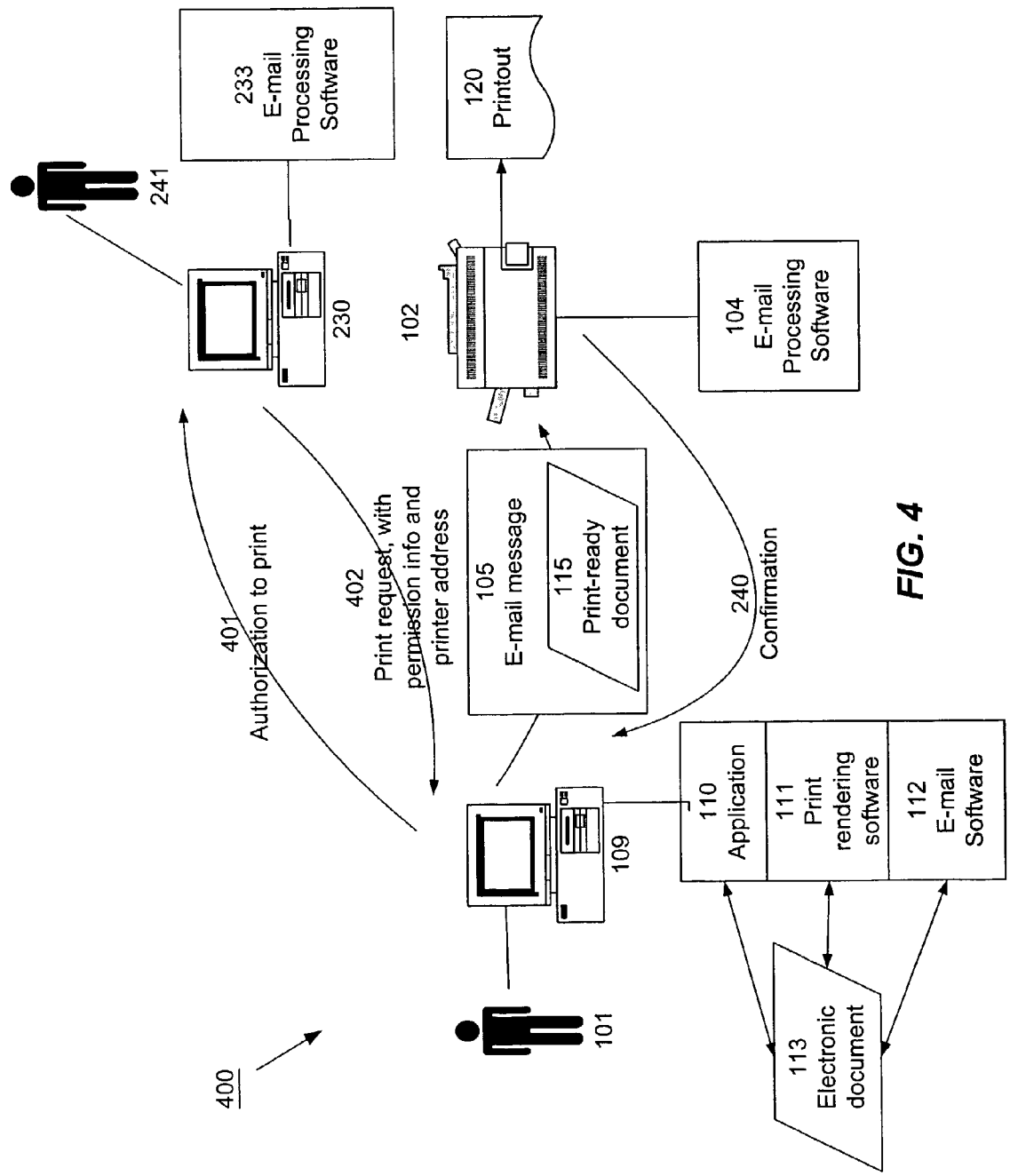
FIG. 4 is a block diagram depicting a system for transmitting authorization to print a document using e-mail as a transport mechanism.
Figure 9:
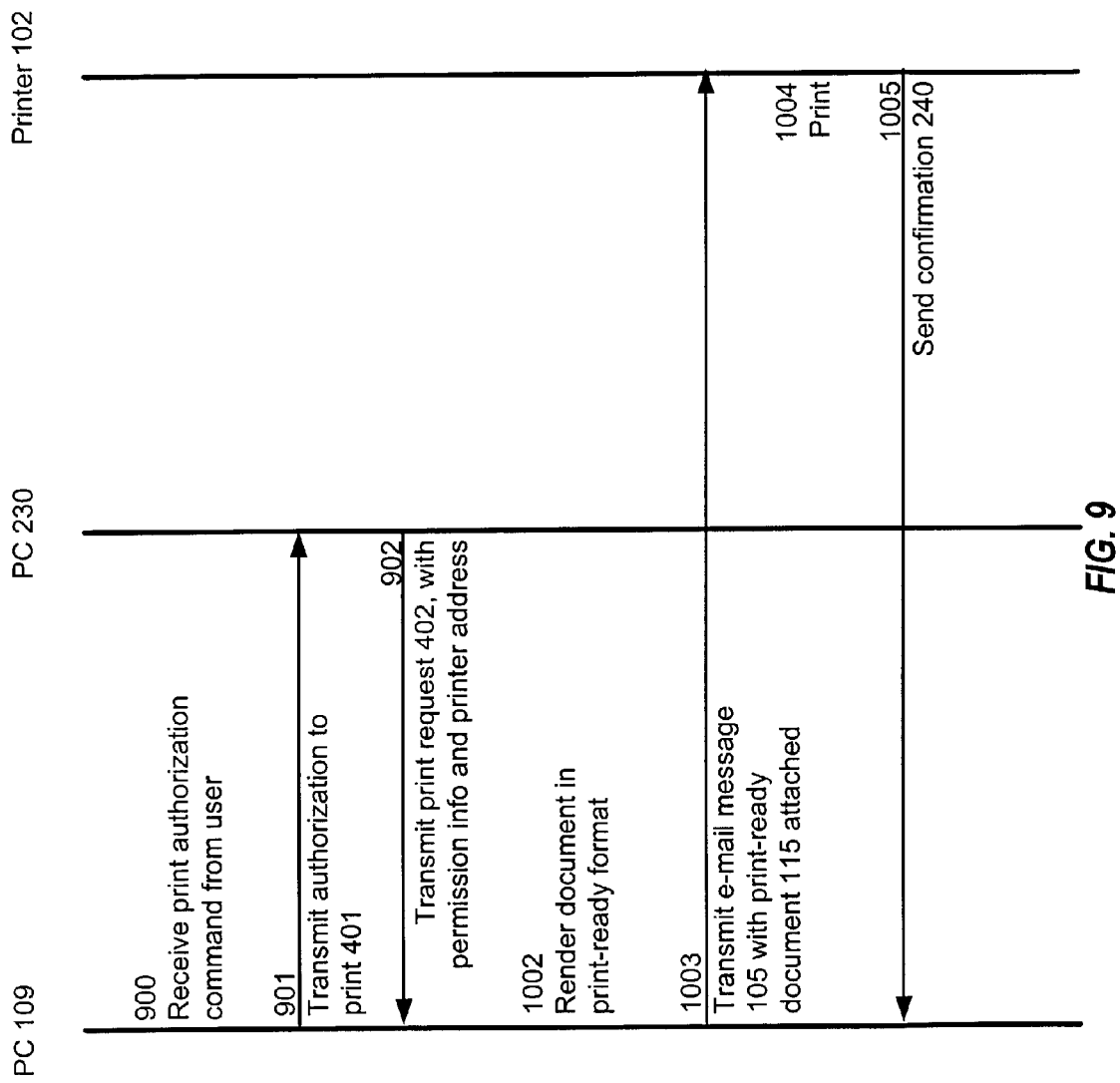
FIG. 9 is an event trace diagram depicting a series of steps for transmitting authorization to print a document using e-mail as a transport mechanism.

Referring now to FIG. 4, there is shown a block diagram depicting a system 400 for transmitting authorization to print a document using e-mail as a transport mechanism. Referring also to FIG. 9, there is shown an event trace diagram depicting a series of steps for transmitting authorization to print a document using e-mail as a transport mechanism, according to one embodiment of the present invention. The techniques of FIGS. 4 and 9 allow a user to make document 113 available for printing, while ensuring that when the destination user 241 requests the print job, the most recent version of document 113 is printed. Thus, even if user 101 or some other user makes revisions to document 113 after print authorization 401 has been sent, printout 120 will properly include such revisions. System 400 further ensures that the document printed at printer 102 has the same formatting and print preferences as if it were printed from user's 101 PC 109. System 400 provides functionality for transmitting document 113 in such a manner that the hard copy printout 120 preserves all such preferences, and further prevents the recipient for editing or altering the document. Furthermore, system 400 provides such functionality without requiring that application 110 or a version thereof be installed at destination PC 230 or printer 102. The following description assumes that the recipient is a user of PC 230 and has physical access to printer 102, and that user 101 and PC 109 are at a remote location with respect to destination PC 230 and printer 102. However, the present invention may be practiced regardless of the actual physical locations of user 101 and devices 109, 230, and 102.

Destination PC 230 is a personal computer; however, any device, such as a printer, fax machine, multifunction device, personal digital assistant (PDA), or the like, can be substituted for PC 230. E-mail processing software 233, running at PC 230, automatically processes print authorizations 401 received from PC 109, provides output to user 241 regarding authorizations 401, and handles transmission of print requests 402 including a printer address and permission information for accessing the printer. These e-mail operations can be implemented, for example, using a script that responds to incoming e-mail messages, according to known techniques. Software component 233 may be preinstalled as part of an operating system installation, or may be installed at any time.

Other components shown in FIG. 4 are substantially similar to corresponding components as described above in connection with FIG. 1.

User 101 initiates a command on PC 109, authorizing a specific destination PC 203 or destination user 241 to print document 113. In one embodiment, the print authorization command contains, for example, an indication of which document 113 may be printed and an e-mail address for destination PC 203 or destination user 241. Particular techniques for activating the print command, specifying which file to print, and providing additional parameters and preferences, are described above in connection with FIGS. 1 and 6. User 101 can specify a destination PC 230 or destination user 241 by typing in an e-mail address associated with PC 230 or user 241, or by selecting from a menu or list of e-mail addresses for destinations (such as a list of previously-used destinations). In the embodiment of FIGS. 4 and 9, it is not necessary for user 101 to specify an e-mail address for printer 102.

Once PC 109 receives 900 the print authorization command from user 101, it transmits 901 an e-mail message to PC 230, containing a print authorization 401. Print authorization 401 may be provided in any predefined format, so that it will be recognized and understood by e-mail processing software 233 running at PC 230. Print authorization 401 may contain particulars, such as the name and size of the document 113 to be printed, so that PC 230 can select an appropriate printer 102 for the print job. In one embodiment, authorization 401 contains a uniform resource locator (URL) or other pointer to document 113. In one embodiment, authorization 401 contains a code, embedded in the pointer, that identifies the source of a print request as an authorized recipient.

PC 230 may present an indication to user 241 that a print authorization 401 has been received. This indication may take the form of an on-screen notification, alert, displayed e-mail message, or the like. In one embodiment, a button, icon, or link is provided, to allow user 241 to request that the document be printed. For example, an e-mail message may be presented, including an attached link to document 113 and including an authorization code. User 241 may click on the button, icon, or link immediately or at some future point in time, to retrieve the most current version of document 113 and print it on printer 102. User 241 may be given the opportunity to select a particular printer 102 for printout of document 113, and may also be provided with a set of options (such as number of copies) for the printout. To whatever extent desired by user 101, however, the configuration parameters and options for the printout of document 113 are controlled by user 101 when initially authorizing the print job.

When user 241 requests a printout, PC 230 transmits 902 an e-mail message 402 to PC 109 containing a printer identifier and permission information for the printer 102 that is to receive the print job. The printer identifier may be provided as an e-mail address. The permission information includes, for example, an indication of which print driver is appropriate for the designated printer, as well as any other information that print rendering software 111 running at PC 109 may need in order to render the print job. In one embodiment, message 402 also includes reference to print authorization 401, so that PC 109 can check that authorization 401 is valid and has not expired. For example, message 402 may include the code that was provided in print authorization 401, or a derivative of said code, for verification of authenticity by PC 109. In one embodiment, message 402 also includes the URL or other pointer to identify the location of document 113.

In one embodiment, message 902 contains addresses and permission information for more than one printer 102. This information may be provided, for example, as a ranked list. Thus, as described above in connection with FIG. 2, if PC 109 is unable to transmit the print job to the first printer 102 on the list, or if PC 109 does not receive confirmation that the print job successfully completed, PC 109 may attempt to transmit the print job to the next printer 102 on the list. Such attempts may be repeated, if necessary, on successive printers 102 on the list, until the print job is successfully completed or until all printers 102 on the list have been tried.

Authorization 401 may be configured to expire after a predetermined period of time, or after PC 230 has generated a predetermined number of print requests 402 based on authorization 401. Alternatively, authorization 401 may be configured to never expire, or to expire upon explicit instructions by user 101. Once PC 109 receives e-mail message 402, it determines whether authorization 401 has expired. If so, PC 109 does not provide the document. If authorization 401 has not expired, PC 109 renders 1002 document 113 according to the parameters and options specified by user 101, and in accordance with permission information received from PC 230. If application 110 has not been launched, PC 109 may automatically launch it in order to proceed with the print rendering 1002 operation. Print rendering software 111, appropriate to the destination printer as specified in permission information, is activated to perform the rendering.

Once document 113 has been rendered 1002, PC 109 generates an e-mail message 105 addressed to printer 102 and containing print-ready document 115 as an attachment. PC 109 transmits 1003 e-mail message 105 using standard e-mail transmission protocols such as SMTP. In one embodiment, PC 109 transmits message 105 to printer 102 using a one-time pad or other secure method. Upon receipt of message 105, printer 102 prints 1004 document 105. Once printer 102 has generated printout 120, in one embodiment printer 102 transmits 1005 confirmation 240 to PC 109. Further description of steps 1002 through 1005 is provided above in connection with FIGS. 1 and 6.

One skilled in the art will recognize that other transmission techniques besides e-mail messages can be used to transmit print authorization 401, print request 402, print-ready document 115, and confirmation 240. E-mail messages are advantageous because they may be sent among PC 109, PC 230, and printer 102 even if a firewall is present; however, in alternative embodiments other transmission techniques may be used.

Figure 5:
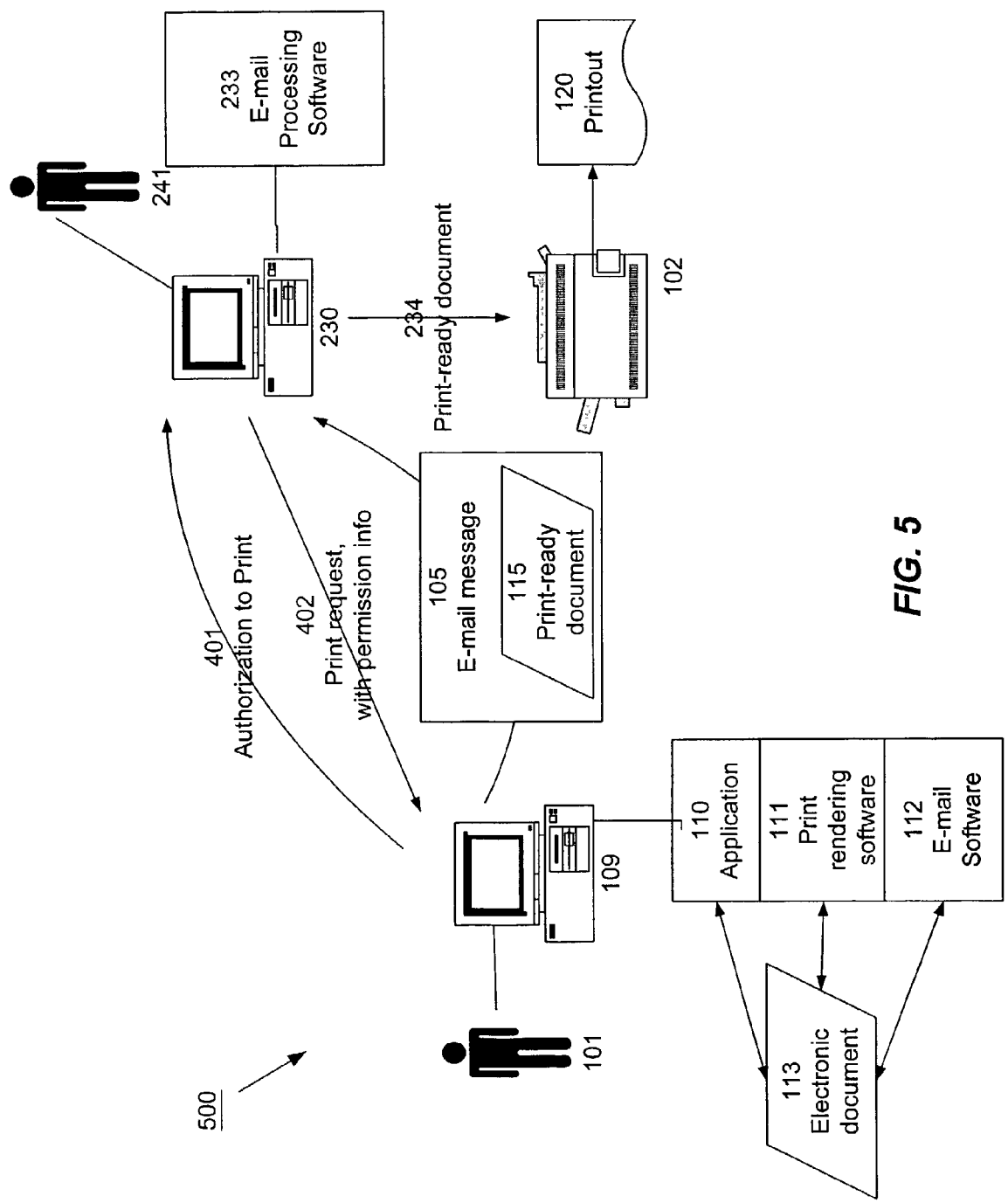
FIG. 5 is a block diagram depicting another embodiment of a system for transmitting authorization to print a document using e-mail as a transport mechanism.
Figure 10:
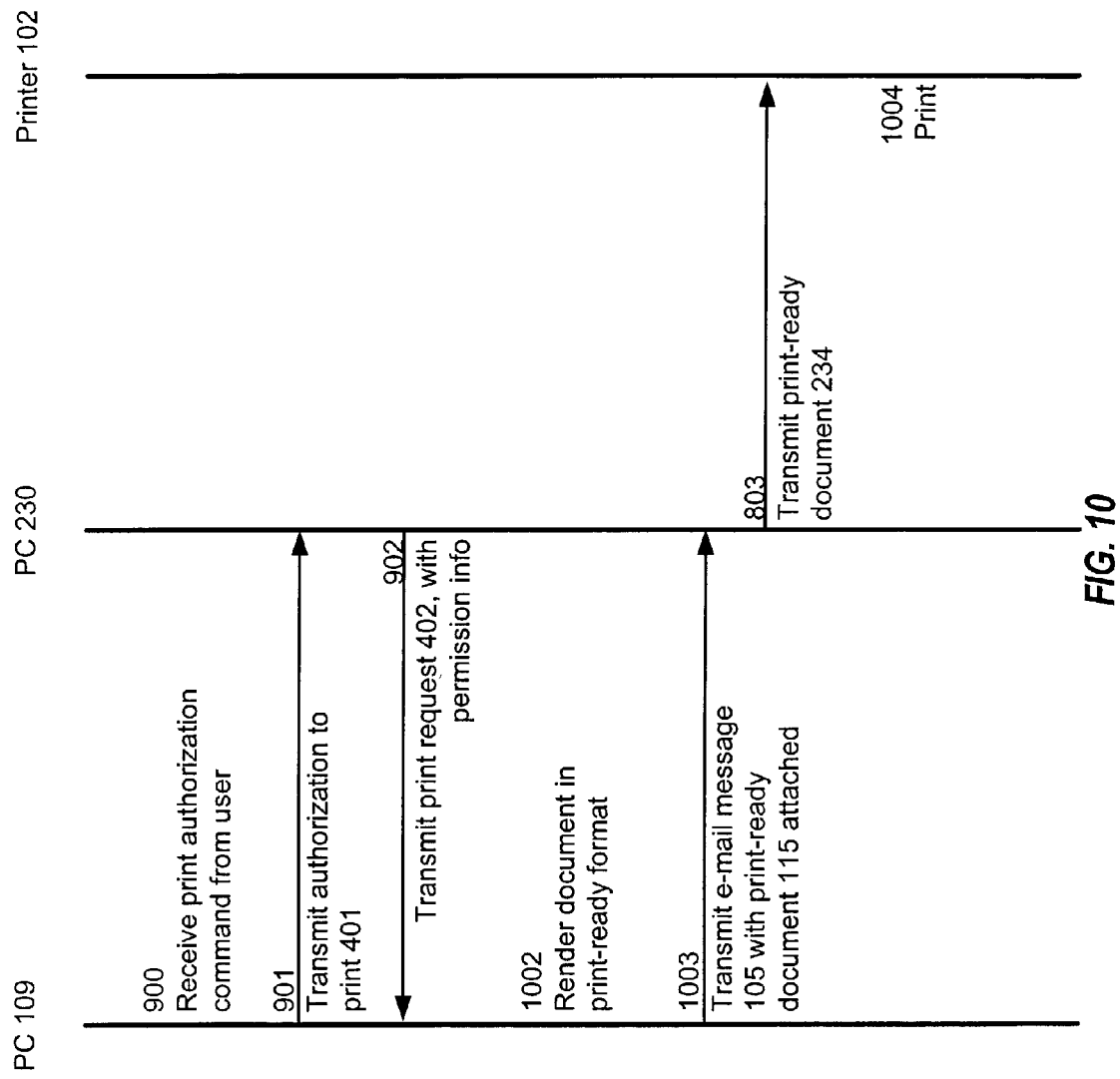
FIG. 10 is an event trace diagram depicting another embodiment of a series of steps for transmitting authorization to print a document using e-mail as a transport mechanism.

Referring now to FIG. 5, there is shown a block diagram depicting another system 500 for transmitting authorization to print a document using e-mail as a transport mechanism. Referring also to FIG. 10, there is shown an event trace diagram depicting a series of steps for transmitting authorization to print a document using e-mail as a transport mechanism, according to one embodiment of the present invention. The system and steps shown in FIGS. 5 and 10 are similar to those of FIGS. 4 and 9 described above, except that the print job is routed to printer 102 by PC 230 rather than being sent directly from PC 109 to printer 102. The components shown in FIG. 5 are substantially similar to corresponding components as described above in connection with FIGS. 1 and 4.

User 101 initiates a command on PC 109, authorizing a specific destination PC 203 or destination user 241 to print document 113. In one embodiment, the print authorization command contains, for example, an indication of which document 113 may be printed and an e-mail address for destination PC 203 or destination user 241. Particular techniques for activating the print command, specifying which file to print, and providing additional parameters and preferences, are described above in connection with FIGS. 1 and 6. User 101 can specify a destination PC 230 or destination user 241 by typing in an e-mail address associated with PC 230 or user 241, or by selecting from a menu or list of e-mail addresses for destinations (such as a list of previously-used destinations). In the embodiment of FIGS. 4 and 9, it is not necessary for user 101 to specify an e-mail address for printer 102.

Once PC 109 receives 900 the print authorization command from user 101, it transmits 901 an e-mail message to PC 230, containing a print authorization 401. When user 241 requests a printout, PC 230 transmits 902 an e-mail message 402 to PC 109 containing permission information for the printer 102 that is to receive the print job. In this embodiment, e-mail message 402 need not include the e-mail address of printer 102, since the print job will be routed to printer 102 by PC 230. Thus, PC 109 does not need to know the e-mail address of printer 102, but rather can send the print job to PC 230. In one embodiment, message 402 also includes reference to print authorization 401, so that PC 109 can check that authorization 401 is valid and has not expired.

Once PC 109 receives e-mail message 402, it determines whether authorization 401 has expired. If so, PC 109 does not provide the document. If authorization 401 has not expired, PC 109 renders 1002 document 113 according to the parameters and options specified by user 101, and in accordance with permission information received from PC 230. If application 110 has not been launched, PC 109 may automatically launch it in order to proceed with the print rendering 1002 operation. Print rendering software 111, appropriate to the destination printer as specified in permission information, is activated to perform the rendering.

Once document 113 has been rendered 1002, PC 109 generates an e-mail message 105 addressed to PC 230 and containing print-ready document 115 as an attachment. PC 109 transmits 1003 e-mail message 105 using standard e-mail transmission protocols such as SMTP. In one embodiment, PC 109 transmits message 105 to PC 230 using a one-time pad or other secure method. Upon receipt of message 105, PC 230 routes 803 the print job as a print-ready document 234 to printer 102, which prints 1004 document 105. PC 230 can send document 234 to printer 102 by any technique, including conventional techniques for sending print jobs to printers, or via e-mail. In some embodiments, printer 102 is not required to have an e-mail address or be accessible via e-mail, since print jobs are transmitted from PC 230 to printer 102 by means other than e-mail transmission. In one embodiment, once PC 230 receives acknowledgement that printer 102 has generated printout 120, in one embodiment PC 230 transmits 1005 confirmation of printing to PC 109.

One skilled in the art will recognize that other transmission techniques besides e-mail messages can be used to transmit print authorization 401, print request 402, print-ready document 115, and confirmation. E-mail messages are advantageous because they may be sent between PC 109 and PC 230 even if a firewall is present; however, in alternative embodiments other transmission techniques may be used.

Software Implementation

As described above, the invention may be implemented using software components 110, 111, 104, and 233. Software components 110 and 111 are installed on PC 109, software component 104 is installed on printer 102, and software component 233 is installed on destination PC 230.

E-mail processing software 104, installed on printer 102, recognizes emailed print commands from PC 109, retrieves print-ready documents 115 from such messages, and prints documents 115 accordingly. In one embodiment, print-ready documents 115 are provided in PostScript format, or in some other format that printer 102 is capable of reading and printing without requiring installation or execution of any particular software application.

Application 110 is a conventional software application, such as Microsoft Word, that the user may use to generate and edit electronic documents 113. Print rendering software 111, which may be a component of an operating system, or a component of application 110, or a plug-in, contains functionality for rendering documents 113 in a print-ready format. Such software is known in the art for conventional printing. E-mail software 112 may be conventional software such as Microsoft Outlook, for generating and sending e-mail messages. Software 112 may be configured to automatically generate and send e-mail messages 105 according to the techniques of the present invention, for example by automated scripts.

Software 104 and 233 periodically poll an e-mail server (not shown) associated with PC 203 or printer 102 to determine whether there are any new e-mail messages requesting or authorizing printing. Such polling may be performed using known functional capabilities of e-mail clients such as, for example, Microsoft Outlook, or it can be programmed as a function of software 104 and 233 so as to be independent of any particular e-mail client software application.

E-Mail Formats

In one embodiment, as described above, the present invention employs e-mail as a transport mechanism for various requests and responses for directory information and for documents. The following are examples of e-mail formats for a directory information request, a directory information transmittal, a document transmission request, and a print-ready document transmittal. As described above, the various components of the invention are configured to generate and respond to e-mails according to these formats. One skilled in the art will recognize that the following e-mail formats are merely exemplary, and that any other format may instead be used.

Print request: <PrintRequest>
Subject: <PrintRequest>
From: e-mail address of PC 109
To: e-mail address of printer 102 (or, in some embodiments, to PC 230)
  Body of message: blank
  Attachment: print-ready document
Print confirmation: <PrintConfirmation>
Subject: <PrintConfirmation>
From: e-mail address of printer 102
To: e-mail address of PC 109
  Body of message: blank
  Attachment: none
Permission information: <PrintPermissions>
Subject: <PrintPermissions>
From: e-mail address of PC 230
To: e-mail address of PC 109
  Body of message: Permission info (and, optionally, printer address)
  Attachment: none
Print authorization: <PrintAuthorization>
Subject: <PrintAuthorization>
From: e-mail address of PC 109
To: e-mail address of PC 230
  Body of message: blank
  Attachment: link to document 113, with authorization code One skilled in the art will recognize that other user interface arrangements and configurations may be implemented without departing from the essential characteristics of the present invention, and that the particular layout and features depicted in the above-described user interface screens are merely exemplary. As can be seen from the above examples, the present invention provides techniques for transmitting print-ready electronic documents to a printer using e-mail as a transport mechanism. As will be understood by those familiar with the art, the invention may be embodied in other specific forms without departing from the spirit or essential characteristics thereof. For example, the particular architectures depicted above are merely exemplary of one implementation of the present invention. The functional elements and method steps described above are provided as illustrative examples of one technique for implementing the invention; one skilled in the art will recognize that many other implementations are possible without departing from the present invention as recited in the claims. Likewise, the particular capitalization or naming of the modules, protocols, features, attributes, or any other aspect is not mandatory or significant, and the mechanisms that implement the invention or its features may have different names or formats. Accordingly, the disclosure of the present invention is intended to be illustrative, but not limiting, of the scope of the invention, which is set forth in the following claims.

What is claimed is:

1. A computer-implemented method for transmitting a document to a printer, comprising:
    receiving at a source device, from a user, a command to print a document and a user-specified print preference setting;
    generating a first electronic mail message addressed to a remote device, the first electronic mail message including a link identifying the document on the source device;
    transmitting the first electronic mail message to the remote device;
    receiving at the source device a print request including the link to the document, and using the link to identify the document to be printed;
    responsive to the received print request:
        rendering at the source device the document identified by the link in a print-ready format according to the user-specified print preference setting;
        generating a second electronic mail message addressed to the printer, the second electronic mail message having an attachment comprising the rendered print-ready document; and
        transmitting the second electronic mail message to the printer.

2. The method of claim 1, wherein transmitting the first electronic mail message comprises transmitting the message across a firewall.

3. The method of claim 1, wherein the received print request specifies a printer, and wherein transmitting the second electronic mail message comprises transmitting the second electronic mail message to the specified printer.

4. The method of claim 1, wherein transmitting the second electronic mail message comprises transmitting the second electronic mail message to the remote device for routing to the printer via an e-mail transport mechanism.

5. The method of claim 1, wherein the remote device comprises a computer.

6. The method of claim 1, further comprising:
    receiving, from the printer, an acknowledgment message.

7. A system for transmitting a document to a printer, comprising:
    a user interface for receiving, from a user, a command to print a document and a user-specified print preference setting;
    an electronic mail generation module, coupled to the user interface, for generating a first electronic mail message addressed to a remote device, the first electronic mail message comprising a link to the document on the source device;
    an electronic mail transmission module, coupled to the electronic mail generation module, for transmitting the first electronic mail message to the remote device;
    an inbound electronic mail processing module, for receiving a print request including the link to the document, the inbound electronic mail processing module identifying the document to be printed using the link; and
    a document renderer, coupled to the inbound electronic mail processing module, for, responsive to the received print request, rendering the document in a print-ready format according to a user-specified print preference setting, the document render coupled to the electronic mail generation module;
    wherein, responsive to the received print request, the electronic mail generation module generates a second electronic mail message addressed to the printer, and the electronic mail transmission module transmits the second electronic mail message to the printer, the second electronic mail message having an attachment comprising the rendered document.

8. The system of claim 7, wherein the electronic mail transmission module transmits the first electronic mail messages across a firewall.

9. The system of claim 7, wherein the received print request specifies a printer, and wherein the electronic mail transmission module transmits the second electronic mail message to the specified printer.

10. The system of claim 7, wherein the electronic mail transmission module transmits the second electronic mail message to the remote device for routing to the printer via an e-mail transport mechanism.

11. The system of claim 7, wherein the remote device comprises a computer.

12. The system of claim 7, wherein:
the inbound electronic mail processing module receives, from the printer, an acknowledgment message.

* * * * *